US011722703B2

(12) United States Patent
Zhang et al.

(10) Patent No.: US 11,722,703 B2
(45) Date of Patent: Aug. 8, 2023

(54) AUTOMATIC PARTITION FOR CROSS BLOCKS

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Hsiao Chiang Chuang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/129,029

(22) Filed: Dec. 21, 2020

(65) Prior Publication Data
US 2021/0112248 A1 Apr. 15, 2021

Related U.S. Application Data

(63) Continuation of application No. PCT/IB2019/055242, filed on Jun. 21, 2019.

(30) Foreign Application Priority Data

Jun. 21, 2018 (WO) ................ PCT/CN2018/092125

(51) Int. Cl.
*H04N 19/96* (2014.01)
*H04N 19/119* (2014.01)
(Continued)

(52) U.S. Cl.
CPC ........... *H04N 19/96* (2014.11); *H04N 19/119* (2014.11); *H04N 19/13* (2014.11); *H04N 19/132* (2014.11);
(Continued)

(58) Field of Classification Search
CPC .... H04N 19/176; H04N 19/119; H04N 19/70; H04N 19/96
See application file for complete search history.

(56) References Cited

U.S. PATENT DOCUMENTS 5,724,451 A * 3/1998 Shin .......................... G06T 9/40
375/E7.255
6,078,694 A 6/2000 Takahashi et al.
(Continued)

FOREIGN PATENT DOCUMENTS

CN 102640492 A 8/2012
CN 107071478 A 8/2017
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
(Continued)

*Primary Examiner* — Daniel Chang
(74) *Attorney, Agent, or Firm* — Perkins Coie LLP

(57) ABSTRACT

In a representative aspect, a method for processing pictures includes segmenting a picture into one or multiple picture segments, determining that a first block of a picture segment covers at least one region that is outside a border of the picture segment, wherein a size of the first block is M×N pixels, selecting a second block of size K×L pixels and where (K≤M and L<N) or (K<M and L≤N) and the second block falls entirely within the picture segment, and processing, using a partition tree, the border of the picture segment, wherein the partition tree is based on the size of the second
(Continued)

block, wherein the processing includes splitting the second block into two or three sub-blocks without an indication on the splitting.

20 Claims, 26 Drawing Sheets

(51) Int. Cl.
| | |
|---|---|
| *H04N 19/13* | (2014.01) |
| *H04N 19/132* | (2014.01) |
| *H04N 19/176* | (2014.01) |
| *H04N 19/513* | (2014.01) |
| *H04N 19/186* | (2014.01) |

(52) U.S. Cl.
CPC ......... *H04N 19/176* (2014.11); *H04N 19/186* (2014.11); *H04N 19/513* (2014.11)

(56) References Cited

U.S. PATENT DOCUMENTS

| | | | |
|---|---|---|---|
| 7,949,049 B2 | 5/2011 | Xu et al. | |
| 10,375,393 B2* | 8/2019 | An | H04N 19/176 |
| 10,382,795 B2* | 8/2019 | Huang | H04N 19/96 |
| 10,484,712 B2 | 11/2019 | Zhang et al. | |
| 10,853,757 B1* | 12/2020 | Hill | G06Q 10/06398 |
| 11,218,738 B2* | 1/2022 | Poirier | H04N 19/96 |
| 2006/0034529 A1* | 2/2006 | Park | H04N 19/563 |
| | | | 375/E7.113 |
| 2008/0183328 A1* | 7/2008 | Danelski | G06Q 10/08 |
| | | | 705/28 |
| 2009/0003443 A1 | 1/2009 | Guo et al. | |
| 2009/0196517 A1* | 8/2009 | Divorra Escoda | H04N 19/61 |
| | | | 382/240 |
| 2010/0086032 A1 | 4/2010 | Chen et al. | |
| 2012/0106629 A1* | 5/2012 | Zheng | H04N 19/176 |
| | | | 375/E7.126 |
| 2012/0281928 A1* | 11/2012 | Cohen | H04N 19/46 |
| | | | 382/240 |
| 2014/0294084 A1 | 10/2014 | Cheon | |
| 2015/0103902 A1* | 4/2015 | Li | H04N 13/161 |
| | | | 375/240.12 |
| 2015/0264372 A1* | 9/2015 | Kolesnikov | H04N 19/52 |
| | | | 375/240.16 |
| 2015/0334405 A1* | 11/2015 | Rosewarne | H04N 19/176 |
| | | | 375/240.02 |
| 2017/0127090 A1* | 5/2017 | Rosewarne | H04N 19/86 |
| 2017/0134760 A1 | 5/2017 | Kirchhoffer et al. | |
| 2017/0214937 A1* | 7/2017 | Lin | H04N 19/563 |
| 2017/0272750 A1* | 9/2017 | An | H04N 19/96 |
| 2017/0272759 A1* | 9/2017 | Seregin | H04N 19/70 |
| 2017/0280162 A1* | 9/2017 | Zhao | H04N 19/103 |
| 2017/0332099 A1 | 11/2017 | Lee et al. | |
| 2017/0347128 A1* | 11/2017 | Panusopone | H04N 19/172 |
| 2018/0014035 A1 | 1/2018 | Sadafale et al. | |
| 2018/0068266 A1* | 3/2018 | Kirmani | G01G 19/005 |
| 2018/0070110 A1* | 3/2018 | Chuang | H04N 19/119 |
| 2018/0084284 A1* | 3/2018 | Rosewarne | H04N 19/119 |
| 2018/0176601 A1* | 6/2018 | Jeong | H04N 19/184 |
| 2018/0199072 A1* | 7/2018 | Li | H04N 19/186 |
| 2018/0309988 A1* | 10/2018 | Alshina | H04N 19/119 |
| 2018/0332288 A1* | 11/2018 | Hsiang | H04N 19/105 |
| 2019/0082193 A1* | 3/2019 | Sun | H04N 19/82 |
| 2019/0313129 A1 | 10/2019 | Lee | |
| 2020/0039551 A1* | 2/2020 | Seagraves | B62B 5/0009 |
| 2020/0252614 A1* | 8/2020 | Choi | H04N 19/593 |
| 2020/0322602 A1* | 10/2020 | Huang | H04N 19/70 |
| 2021/0021811 A1* | 1/2021 | Xu | H04N 19/176 |
| 2021/0092377 A1 | 3/2021 | Zhang et al. | |
| 2021/0112284 A1 | 4/2021 | Zhang et al. | |
| 2021/0136369 A1* | 5/2021 | Lim | H04N 19/13 |
| 2021/0250621 A1* | 8/2021 | Huang | H04N 19/167 |
| 2021/0281873 A1* | 9/2021 | Chen | H04N 19/176 |

FOREIGN PATENT DOCUMENTS

| | | |
|---|---|---|
| CN | 108028933 A | 5/2018 |
| EP | 3059708 A1 | 8/2016 |
| WO | 2019244115 A2 | 12/2019 |

OTHER PUBLICATIONS

JEM-7.0: https://jvet.hhi.fraunhofer.de/svn/svn_HMJEMSoftware/tags/HM-16.6-JEM-7.0.

H.265/HEVC, https://www.itu.int/rec/T-REC-H.265.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Ma et al. "Description of Core Experiment: Partitioning," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J1021, 2018.

Sullivan et al. "Overview of the High Efficiency Video Coding (HEVC) Standard," IEEE Transactions on Circuits and Systems for Video Technology, Dec. 2012, 22(12):1649-1668.

International Search Report and Written Opinion from PCT/IB2019/055243 dated Oct. 28, 2019, (16 pages).

Non-Final Office Action from U.S. Appl. No. 17/128,965 dated Dec. 21, 2021.

Yang et al. "CTB Splitting on Frame Boundary for Arbitrary Resolution Video," Joint Collaborative Team on Video Coding (JCT-VC) of ITU-T SG 16 WP3 and ISO/IEC JTC1/SC29/WG11, 3rd Meeting, Guangzhou, CN, Oct. 7-15, 2010, document JCTVC-C025, 2010.

Final Office Action from U.S. Appl. No. 17/128,965 dated Apr. 12, 2022.

Non-Final Office Action from U.S. Appl. No. 17/128,965 dated Dec. 7, 2022.

* cited by examiner

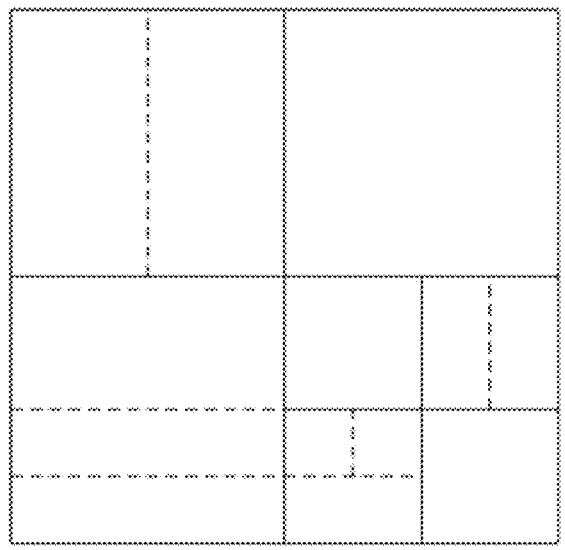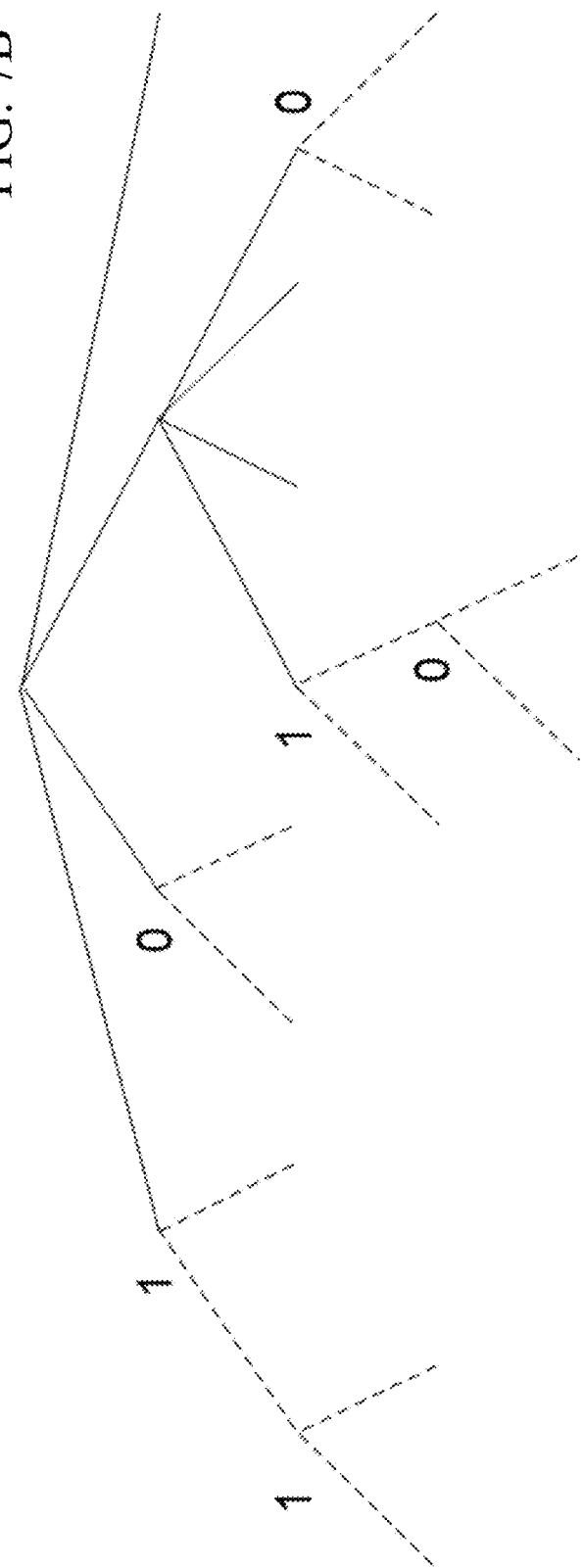

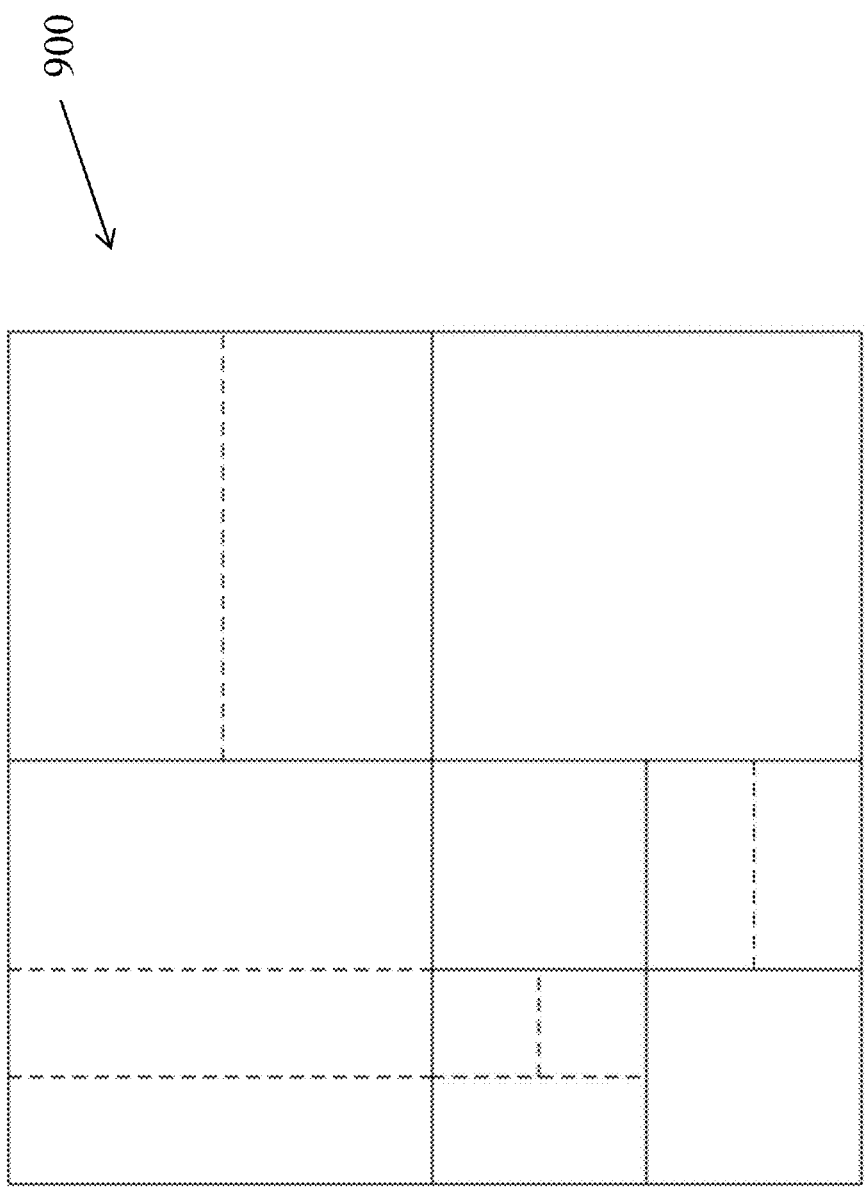

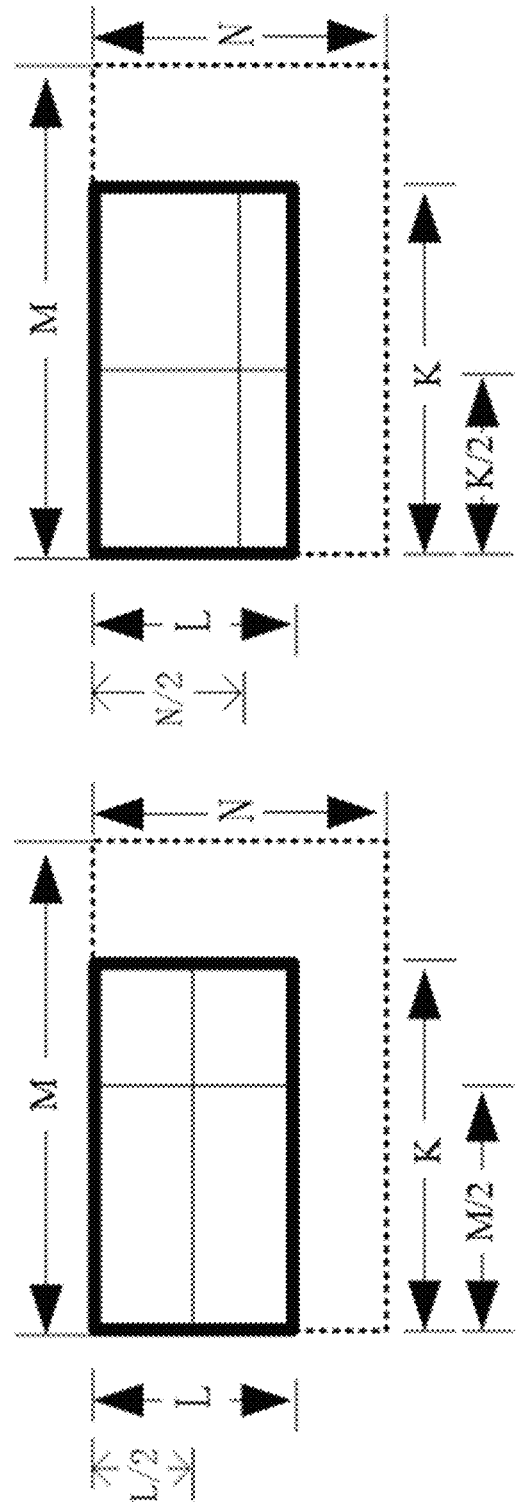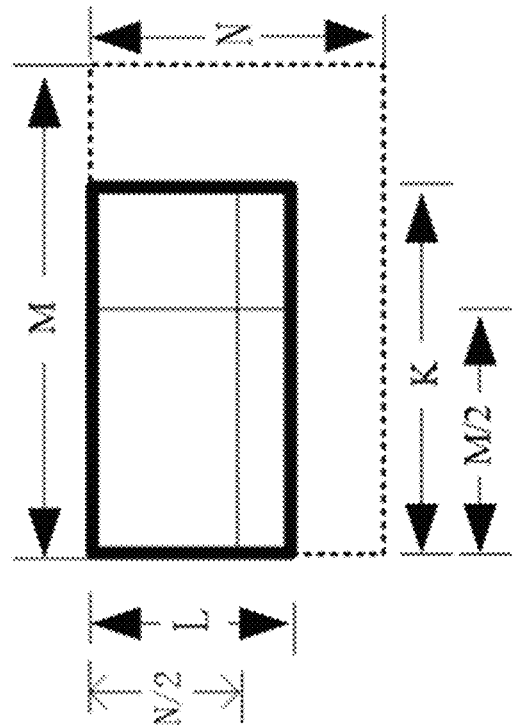
FIG. 13A
FIG. 13B
FIG. 13C

AUTOMATIC PARTITION FOR CROSS BLOCKS

CROSS REFERENCE TO RELATED APPLICATIONS

This application is a continuation of International Application No. PCT/IB2019/055242, filed on Jun. 21, 2019 which claims the priority to and benefits of International Application No. PCT/CN2018/092125, filed on Jun. 21, 2018. All of the aforementioned patent applications are hereby incorporated by reference in their entireties.

TECHNICAL FIELD

This patent document is directed generally to image and video coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to picture border coding for image and video coding are described. More generally, the presently disclosed technology provides enhancements for the processing of sub-blocks that are located at the borders of a block of video data (e.g., in a picture, slice, tile and the like). The described methods may be applied to both the existing video coding standards (e.g., High Efficiency Video Coding (HEVC)) and future video coding standards (e.g., Versatile Video Coding) or video codecs.

In one representative aspect, the disclosed technology may be used to provide a method for processing pictures. This method includes segmenting a picture into one or multiple picture segments, determining that a first block of a picture segment covers at least one region that is outside a border of the picture segment, wherein a size of the first block is M×N pixels, selecting a second block of size K×L pixels, where (K≤M and L<N) or (K<M and L≤N) and the second block falls entirely within the picture segment, and processing, using a partition tree, the border of the picture segment, wherein the partition tree is based on the size of the second block, and wherein the processing includes splitting the second block into sub-blocks without an indication on the splitting.

In another aspect, the method for processing pictures includes segmenting a picture into one or multiple picture segments, determining that a first block of a picture segment covers at least one region that is outside a border of the picture segment, wherein a size of the first block is M×N pixels, selecting a second block of size K×L pixels, where (K≤M and L<N) or (K<M and L≤N), and processing, using a partition tree, the border of the picture segment, wherein the partition tree is based on the size of the second block, wherein a size of the partition tree is based on a minimally allowed partition tree size or a maximally allowed partition tree depth.

In another aspect, the method for processing pictures includes parsing a bitstream representation of a picture in which the picture is coded by dividing into one or more multiple picture segments, determining that a first block of a picture segment covers at least one region that is outside a border of the picture segment, wherein a size of the first block is M×N pixels, selecting a second block of size K×L pixels, wherein (K≤M and L<N) or (K<M and L≤N), and processing, using a partition tree, the border of the picture segment, wherein the processing includes splitting the second block into sub-blocks without an indication on the splitting.

In another aspect, the method for processing pictures includes parsing a bitstream representation of a picture in which the picture is coded by dividing into one or more multiple picture segments, determining that a first block of a picture segment covers at least one region that is outside a border of the picture segment, wherein a size of the first block is M×N pixels, selecting a second block of size K×L pixels, wherein (K≤M and L<N) or (K<M and L≤N), and processing, using a partition tree, the border of the picture segment, wherein a size of the partition tree is based on a minimally allowed partition tree size or a maximally allowed partition tree depth.

In another aspect, a method of processing pictures is provided to include segmenting a picture into one or more picture segments; determining that a first block comprises a first portion inside of a picture segment and a second portion outside of the picture segment; and performing a conversion between the first block and a bitstream representation of the first block using a transform with a size not larger than the first portion.

In another aspect, a method of processing pictures is provided to include: segmenting a picture into one or more picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N); and processing the border of the picture segment, and wherein different partition trees are used to process a luma component and a chroma component included in the first block.

In another aspect, a method of processing pictures is provided to include: segmenting a picture into one or more picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N); and processing the border of the picture segment, and wherein a same partition tree is used to process a luma component and a chroma component included in the first block.

In another aspect, a method of processing pictures is provided to comprise: selecting a first block in a first picture with M×N samples; and selecting a second block in a second picture with K×L samples, wherein K×L is unequal to M×N; and wherein the first block is processed using a partition tree split from the M×N samples and the second block is processed using another partition tree split from the K×L samples.

In another aspect, a method of processing pictures is provided to include segmenting a picture into one or more picture segments; determining that a first block comprises a first portion inside of a picture segment and a second portion outside of the picture segment; and performing a conversion between the first block and a bitstream representation of the first block using a transform with a size not larger than the first portion.

In another aspect, a method of processing pictures is provided to include: segmenting a picture into one or more picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N); and processing the border of the picture segment, and wherein different partition trees are used to process a luma component and a chroma component included in the first block.

In another aspect, a method of processing pictures is provided to include: segmenting a picture into one or more picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N); and processing the border of the picture segment, and wherein a same partition tree is used to process a luma component and a chroma component included in the first block.

In another aspect, a method of processing pictures is provided to comprise: selecting a first block in a first picture with M×N samples; and selecting a second block in a second picture with K×L samples, wherein K×L is unequal to M×N; and wherein the first block is processed using a partition tree split from the M×N samples and the second block is processed using another partition tree split from the K×L samples.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 7A and 7B show an example of the subdivisions and a corresponding QTBT (quadtree plus binary tree) for a largest coding unit (LCU).

FIG. 9 shows an example subdivision of a CB based on a QTBT.

FIGS. 13A-13G show examples of partitioning a CB using quadtree (QT), binary tree (BT) and ternary tree (TT) structures.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Example Embodiments of Picture Border Coding

Figure 1:
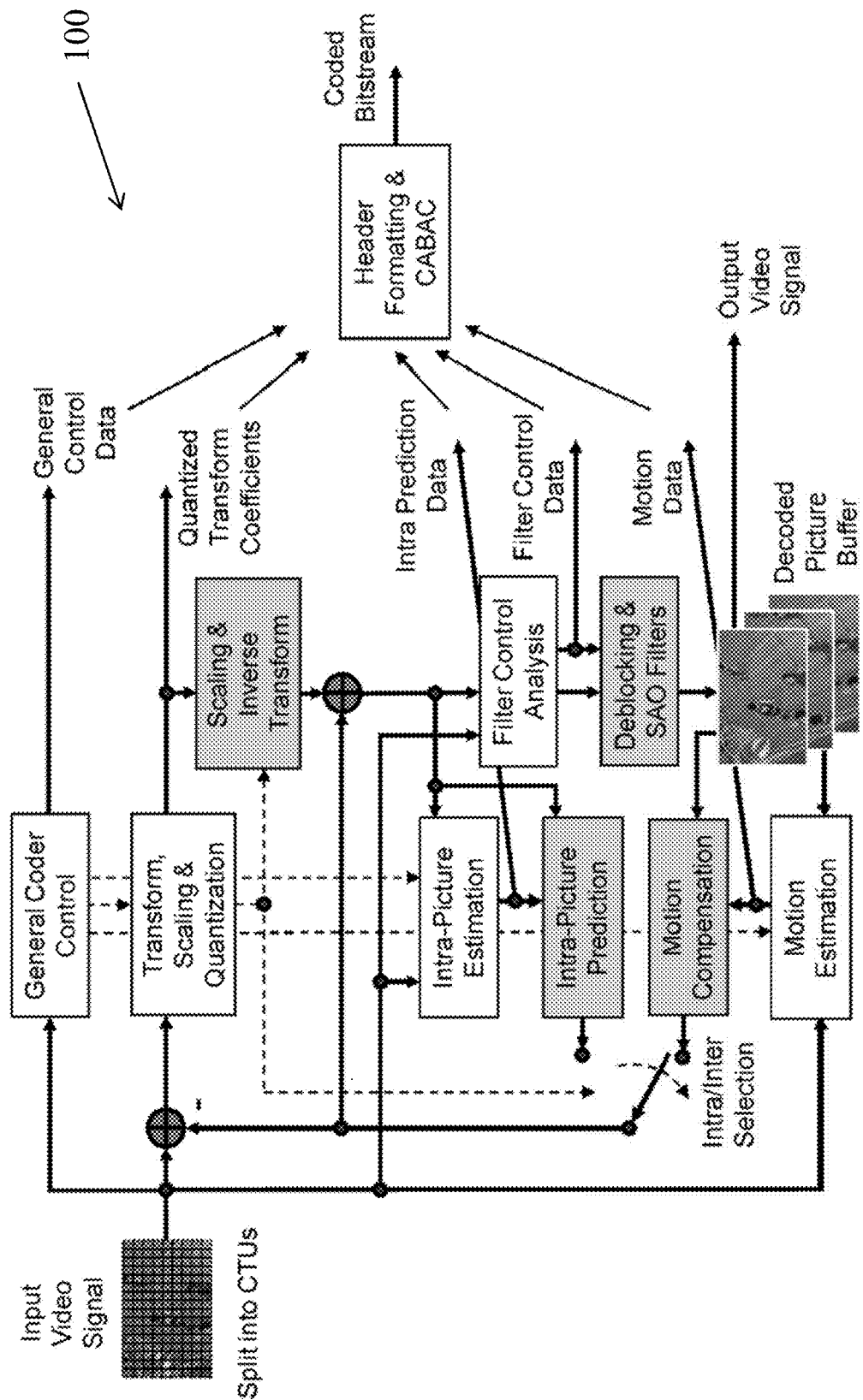
FIG. 1 shows an example block diagram of a typical High Efficiency Video Coding (HEVC) video encoder and decoder.

FIG. 1 shows an example block diagram of a typical HEVC video encoder and decoder. An encoding algorithm producing an HEVC compliant bitstream would typically proceed as follows. Each picture is split into block-shaped regions, with the exact block partitioning being conveyed to the decoder. The first picture of a video sequence (and the first picture at each clean random access point into a video sequence) is coded using only intra-picture prediction (that uses some prediction of data spatially from region-to-region within the same picture, but has no dependence on other pictures). For all remaining pictures of a sequence or between random access points, inter-picture temporally predictive coding modes are typically used for most blocks. The encoding process for inter-picture prediction consists of choosing motion data comprising the selected reference picture and motion vector (MV) to be applied for predicting the samples of each block. The encoder and decoder generate identical inter-picture prediction signals by applying motion compensation (MC) using the MV and mode decision data, which are transmitted as side information.

The residual signal of the intra- or inter-picture prediction, which is the difference between the original block and its prediction, is transformed by a linear spatial transform. The transform coefficients are then scaled, quantized, entropy coded, and transmitted together with the prediction information.

The encoder duplicates the decoder processing loop (see gray-shaded boxes in FIG. 1) such that both will generate identical predictions for subsequent data. Therefore, the quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures. In general, the order of encoding or decoding processing of pictures often differs from the order in which they arrive from the source; necessitating a distinction between the decoding order (i.e., bitstream order) and the output order (i.e., display order) for a decoder.

Video material to be encoded by HEVC is generally expected to be input as progressive scan imagery (either due to the source video originating in that format or resulting from deinterlacing prior to encoding). No explicit coding features are present in the HEVC design to support the use of interlaced scanning, as interlaced scanning is no longer used for displays and is becoming substantially less common for distribution. However, a metadata syntax has been provided in HEVC to allow an encoder to indicate that interlace-scanned video has been sent by coding each field (i.e., the even or odd numbered lines of each video frame) of interlaced video as a separate picture or that it has been sent by coding each interlaced frame as an HEVC coded picture. This provides an efficient method of coding interlaced video without burdening decoders with a need to support a special decoding process for it.

1.1. Examples of Partition Tree Structures in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
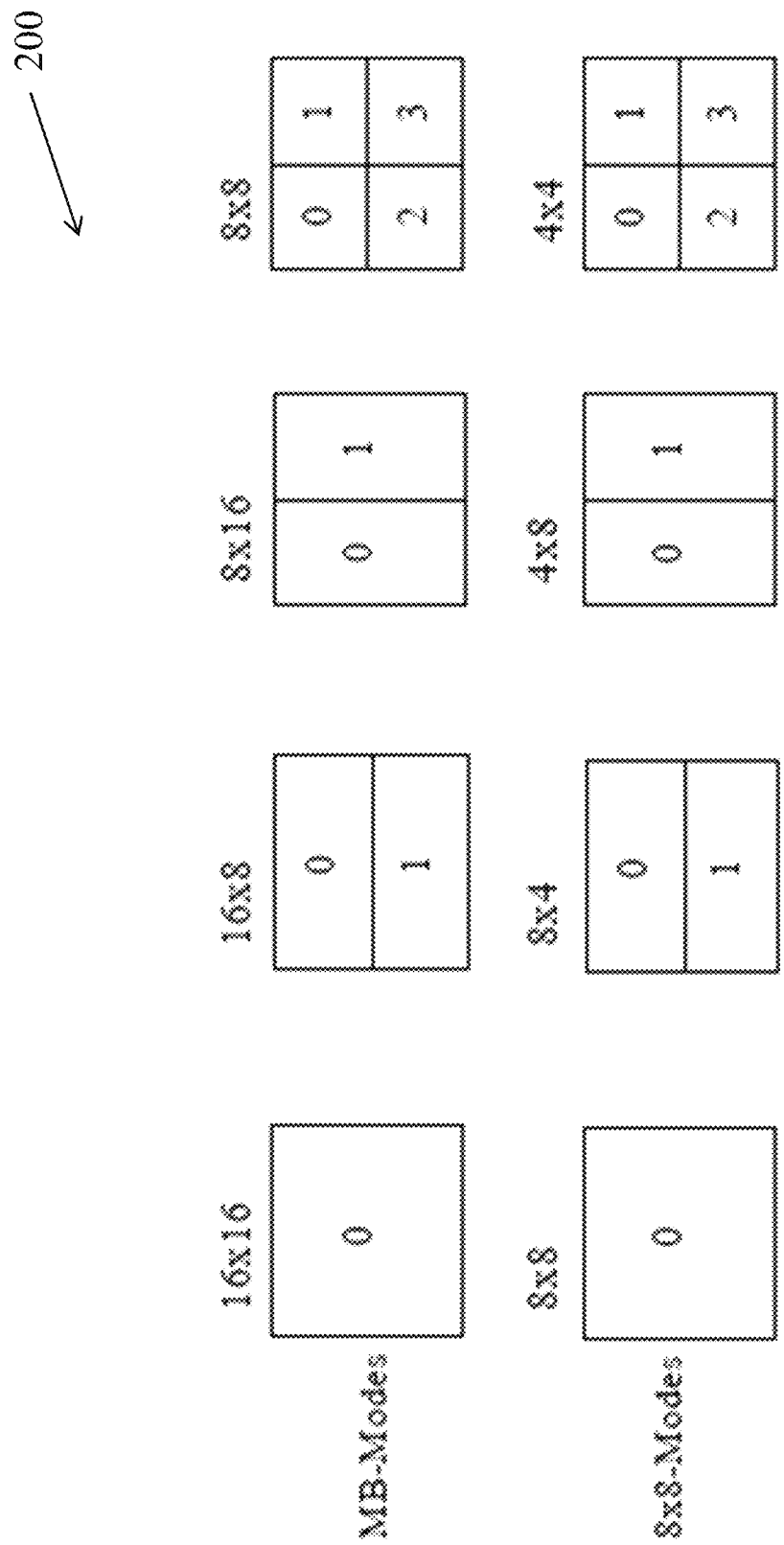
FIG. 2 shows examples of macroblock (MB) partitions in H.264/AVC.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4, as shown in FIG. 2. Only one motion vector (MV) per sub-macroblock partition is allowed.

1.2 Examples of Partition Tree Structures in HEVC

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

Certain features involved in hybrid video coding using HEVC include:

(1) Coding tree units (CTUs) and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

(2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
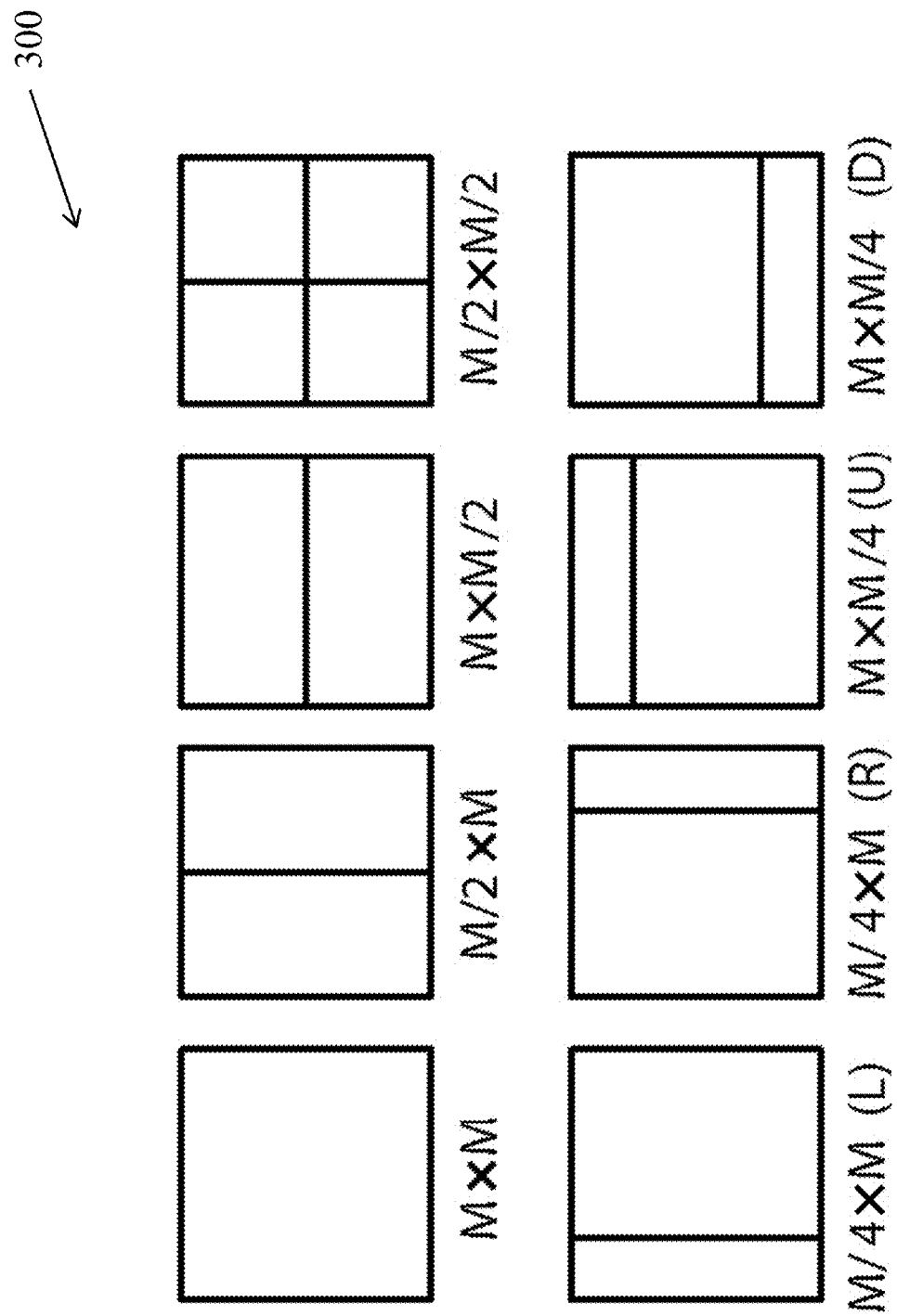
FIG. 3 shows examples of splitting coding blocks (CBs) into prediction blocks (PBs).

(3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for an M×M CU.

(4) Transform units (Tus) and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

1.2.1. Examples of Tree-Structured Partitioning into TBs and TUs

Figure 4A:
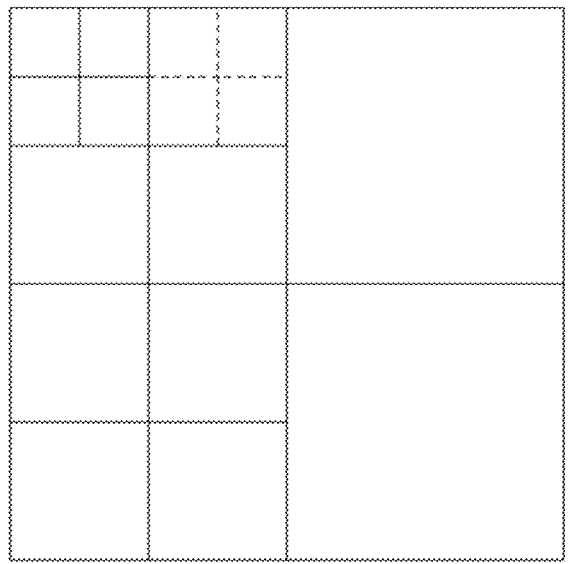
FIGS. 4A and 4B show an example of the subdivision of a coding tree block (CTB) into CBs and transform blocks (TBs), and the corresponding quadtree, respectively.
Figure 4B:
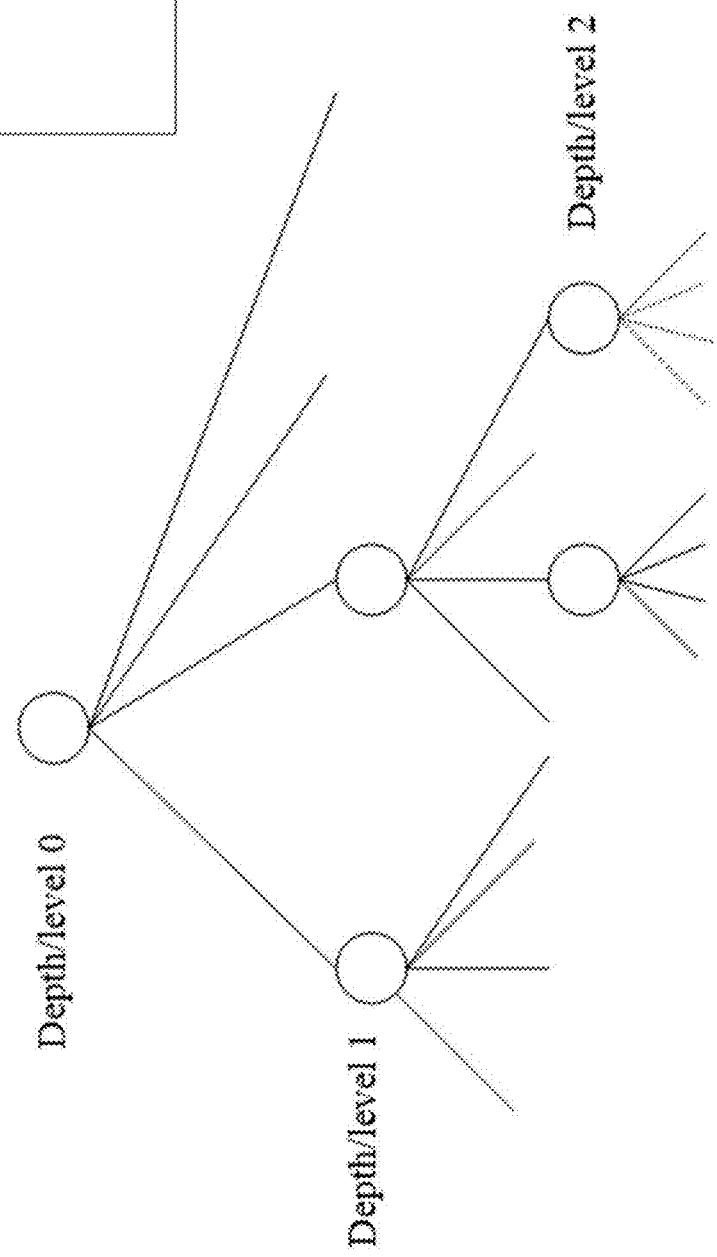

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

1.2.2. Examples of Picture Border Coding

The borders of the picture are defined in units of the minimally allowed luma CB size. As a result, at the right and bottom borders of the picture, some CTUs may cover regions that are partly outside the borders of the picture. This condition is detected by the decoder, and the CTU quadtree is implicitly split as necessary to reduce the CB size to the point where the entire CB will fit into the picture.

Figure 5:
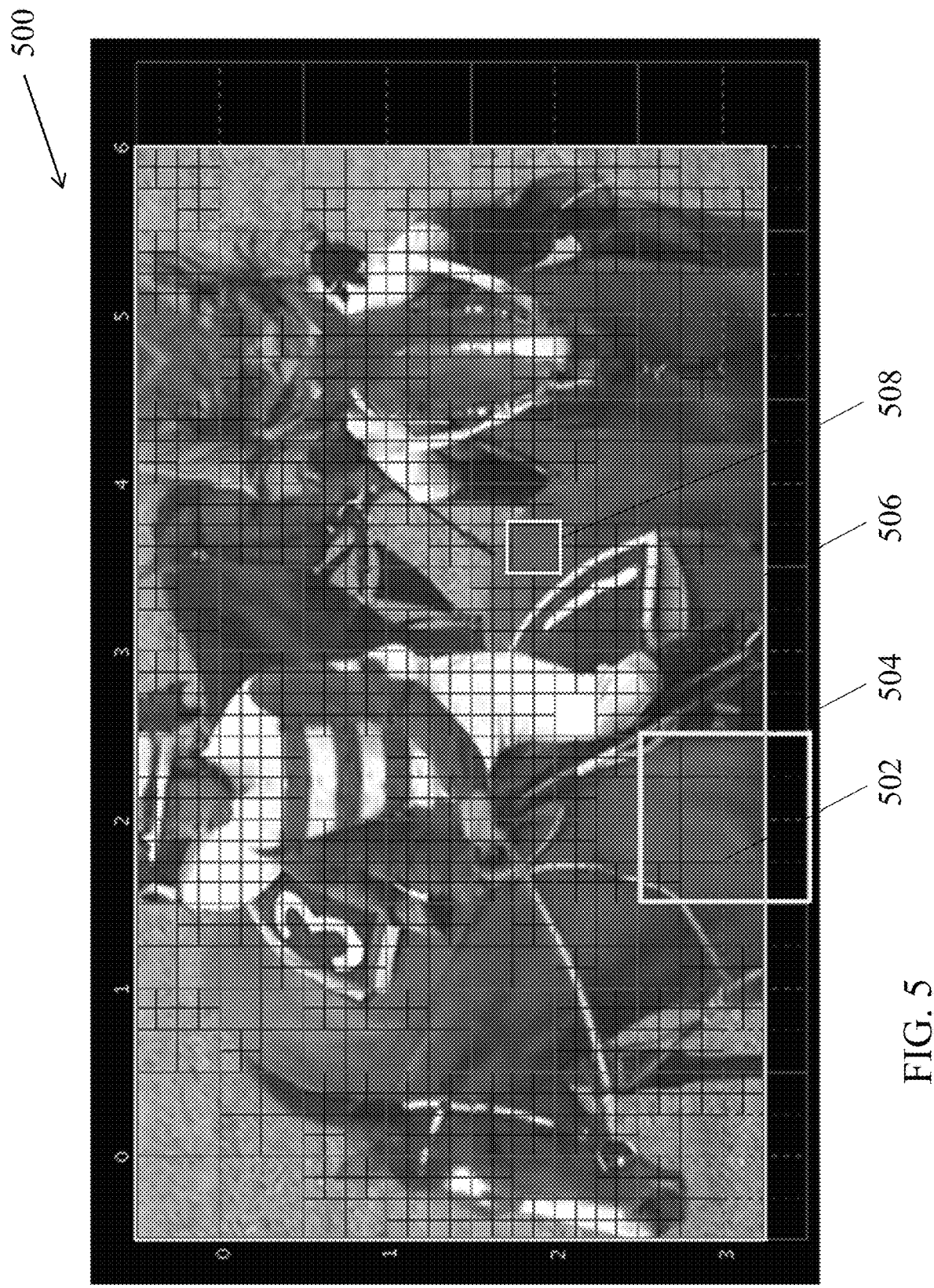
FIG. 5 shows an example of a partition structure of one frame.

FIG. 5 shows an example of a partition structure of one frame, with a resolution of 416×240 pixels and dimensions 7 CTBs×4 CTBs, wherein the size of a CTB is 64×64. As shown in FIG. 5, the CTBs that are partially outside the right and bottom border have implied splits (dashed lines, indicated as 502), and the CUs that fall outside completely are simply skipped (not coded).

Figures 6A, 6B:
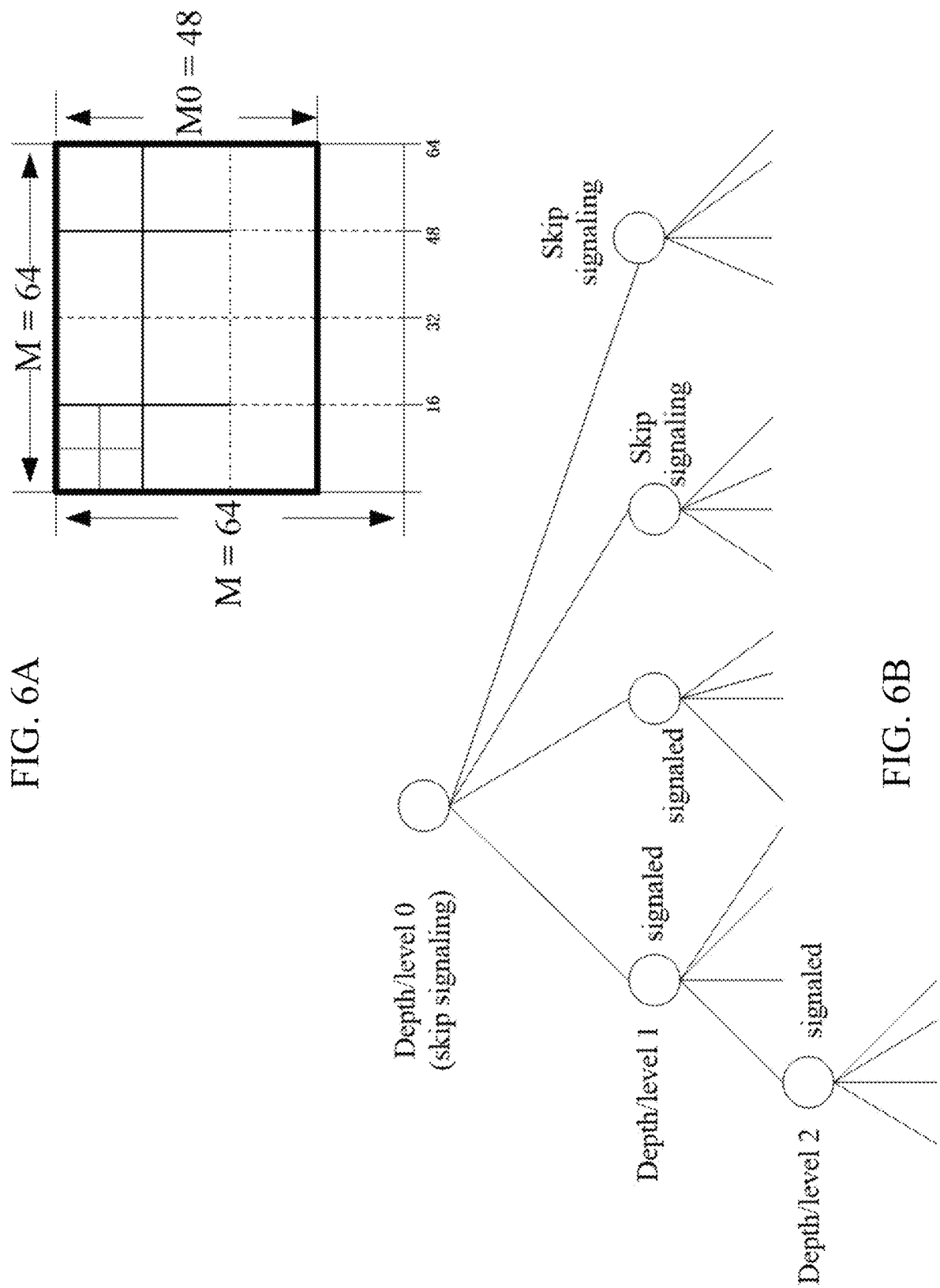
FIGS. 6A and 6B show the subdivisions and signaling methods, respectively, of a CTB highlighted in the exemplary frame in FIG. 5.

In the example shown in FIG. 5, the highlighted CTB (504), with row CTB index equal to 2 and column CTB index equal to 3, has 64×48 pixels within the current picture, and doesn't fit a 64×64 CTB. Therefore, it is forced to be split to 32×32 without the split flag signaled. For the top-left 32×32, it is fully covered by the frame. When it chooses to be coded in smaller blocks (8×8 for the top-left 16×16, and the remaining are coded in 16×16) according to rate-distortion cost, several split flags need to be coded. These split flags (one for whether split the top-left 32×32 to four 16×16 blocks, and flags for signaling whether one 16×16 is further split and 8×8 is further split for each of the four 8×8 blocks within the top-left 16×16) have to be explicitly signaled. A similar situation exists for the top-right 32×32 block. For the two bottom 32×32 blocks, since they are partially outside the picture border (506), further QT split needs to be applied without being signaled. FIGS. 6A and 6B show the subdivisions and signaling methods, respectively, of the highlighted CTB (504) in FIG. 5.

1.2.3. Examples of CTB Size Indications

An example RBSP (raw byte sequence payload) syntax table for the general sequence parameter set is shown in Table 1.

TABLE 1

RBSP syntax structure

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( 1, sps_max_sub_layers_minus1 ) | |
|   ... | |
|   log2_min_luma_coding_block_size_minus3 | ue(v) |
|   log2_diff_max_min_luma_coding_block_size | ue(v) |
|   log2_min_luma_transform_block_size_minus2 | ue(v) |
|   log2_diff_max_min_luma_transform_block_size | ue(v) |
|   .. | |
| } | |

The corresponding semantics includes:

log2_min_luma_coding_block_size_minus3 plus 3 specifies the minimum luma coding block size; and log2_diff_max_min_luma_coding_block_size specifies the difference between the maximum and minimum luma coding block size.

The variables MinCbLog2SizeY, CtbLog2SizeY, MinCbSizeY, CtbSizeY, PicWidthInMinCbsY, PicWidthInCtbsY, PicHeightInMinCbsY, PicHeightInCtbsY, PicSizeInMinCbsY, PicSizeInCtbsY, PicSizeInSamplesY, PicWidthInSamplesC and PicHeightInSamplesC are derived as follows:

```
MinCbLog2SizeY = log2_min_luma_coding_block_size_minus3 + 3
CtbLog2SizeY = MinCbLog2SizeY + log2_diff_max_min_luma_coding_block_size
MinCbSizeY = 1 << MinCbLog2SizeY
CtbSizeY = 1 << CtbLog2SizeY
PicWidthInMinCbsY = pic_width_in_luma_samples / MinCbSizeY
PicWidthInCtbsY = Ceil( pic_width_in_luma_samples ÷ CtbSizeY )
PicHeightInMinCbsY = pic_height_in_luma_samples / MinCbSizeY
PicHeightInCtbsY = Ceil( pic_height_in_luma_samples ÷ CtbSizeY )
PicSizeInMinCbsY = PicWidthInMinCbsY * PicHeightInMinCbsY
PicSizeInCtbsY = PicWidthInCtbsY * PicHeightInCtbsY
PicSizeInSamplesY = pic_width_in_luma_samples * pic_height_in_luma_samples
PicWidthInSamplesC = pic_width_in_luma_samples / SubWidthC
PicHeightInSamplesC = pic_height_in_luma_samples / SubHeightC
```

The variables CtbWidthC and CtbHeightC, which specify the width and height, respectively, of the array for each chroma CTB, are derived as follows:

If chroma_format_idc is equal to 0 (monochrome) or separate_colour_plane_flag is equal to 1, CtbWidthC and CtbHeightC are both equal to 0;

Otherwise, CtbWidthC and CtbHeightC are derived as follows:

```
CtbWidthC = CtbSizeY / SubWidthC
CtbHeightC = CtbSizeY / SubHeightC
```

1.3. Examples of Quadtree Plus Binary Tree Block Structures with Larger CTUs in JEM In some embodiments, future video coding technologies are explored using a reference software known as the Joint Exploration Model (JEM). In addition to binary tree structures, JEM describes quadtree plus binary tree (QTBT) and ternary tree (TT) structures.

1.3.1. Examples of the QTBT Block Partitioning Structure

In contrast to HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 7A, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme:

CTU size: the root node size of a quadtree, the same concept as in HEVC
  MinQTSize: the minimally allowed quadtree leaf node size
  MaxBTSize: the maximally allowed binary tree root node size
  MaxBTDepth: the maximally allowed binary tree depth
  MinBTSize: the minimally allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 7A shows an example of block partitioning by using QTBT, and FIG. 7B shows the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

1.4. Ternary-Tree (TT) for Versatile Video Coding (VVC)

Figure 8A:
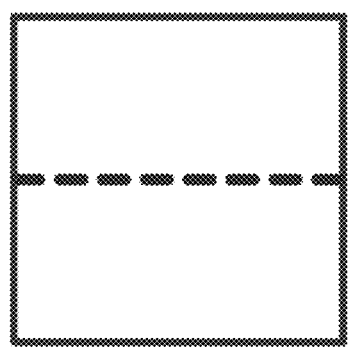
FIGS. 8A-8E show examples of partitioning a coding block.
Figure 8B:
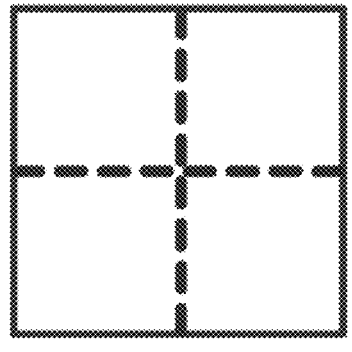
Figure 8E:
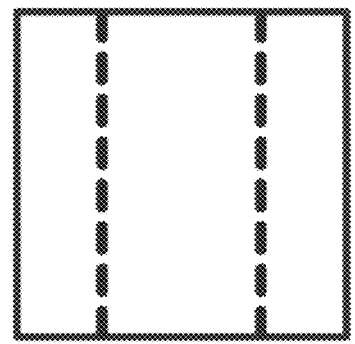
Figure 8D:
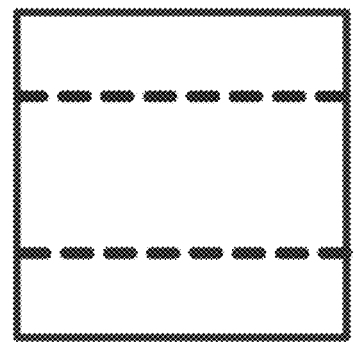
Figure 8C:
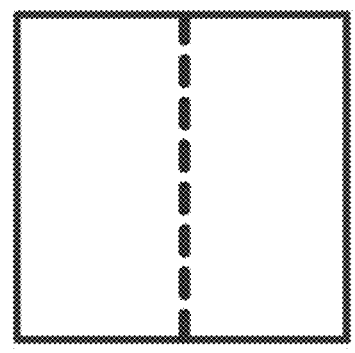
Figure 10E:
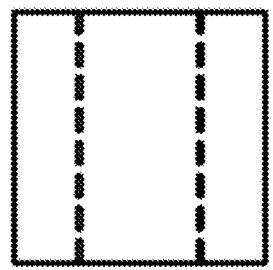
FIGS. 10A-10I show examples of the partitions of a CB supported the multi-tree type (MTT), which is a generalization of the QTBT.
Figure 10D:
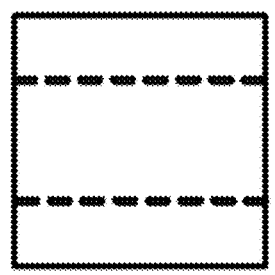
Figure 10I:
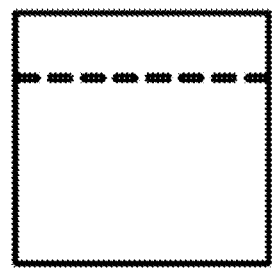
Figure 10C:
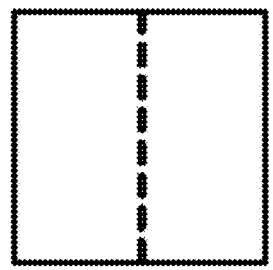
Figure 10H:
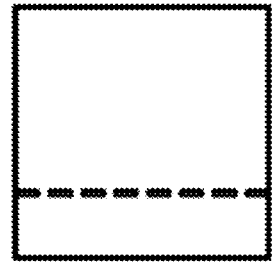
Figure 10B:
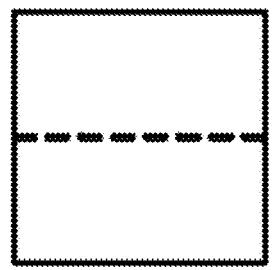
Figure 10G:
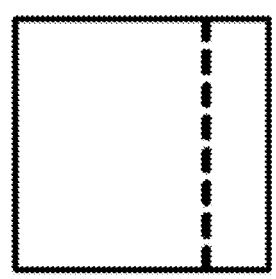
Figure 10A:
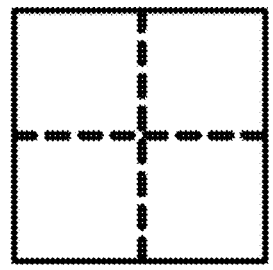
Figure 10F:
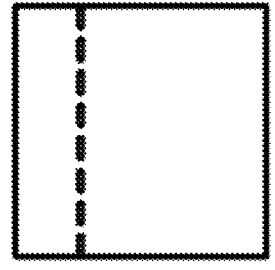

FIG. 8A shows an example of quad-tree (QT) partitioning, and FIGS. 8B and 8C show examples of the vertical and horizontal binary-tree (BT) partitioning, respectively. In some embodiments, and in addition to quad-trees and binary-trees, ternary tree (TT) partitions, e.g., horizontal and vertical center-side ternary-trees (as shown in FIGS. 8D and 8E) are supported.

In some implementations, two levels of trees are supported: region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

1.5. Examples of Partitioning Structures in Alternate Video Coding Technologies

In some embodiments, a tree structure called a Multi-Tree Type (MTT), which is a generalization of the QTBT, is supported. In QTBT, as shown in FIG. 9, a Coding Tree Unit (CTU) is firstly partitioned by a quad-tree structure. The quad-tree leaf nodes are further partitioned by a binary-tree structure.

The structure of the MTT constitutes of two types of tree nodes: Region Tree (RT) and Prediction Tree (PT), supporting nine types of partitions, as shown in FIG. 10. A region tree can recursively split a CTU into square blocks down to a 4×4 size region tree leaf node. At each node in a region tree, a prediction tree can be formed from one of three tree types: Binary Tree, Ternary Tree, and Asymmetric Binary Tree. In a PT split, it is prohibited to have a quadtree partition in branches of the prediction tree. As in JEM, the luma tree and the chroma tree are separated in I slices.

Figure 11:
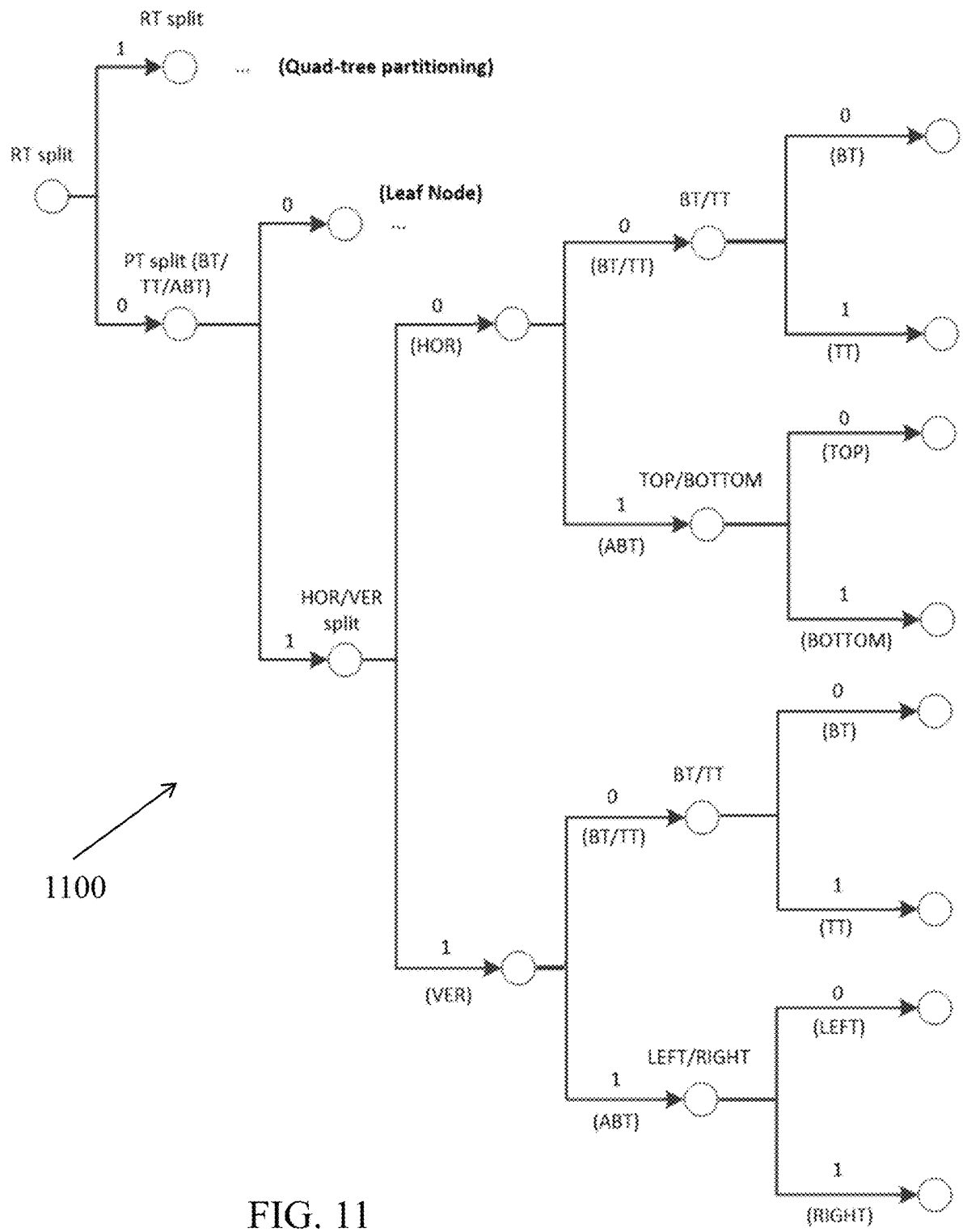
FIG. 11 shows an example of tree-type signaling.

In general, RT signaling is same as QT signaling in JEM with exception of the context derivation. For PT signaling, up to 4 additional bins are required, as shown in FIG. 11. The first bin indicates whether the PT is further split or not. The context for this bin is calculated based on the observation that the likelihood of further split is highly correlated to the relative size of the current block to its neighbors. If PT is further split, the second bin indicates whether it is a horizontal partitioning or vertical partitioning. In some embodiments, the presence of the center-sided triple tree and the asymmetric binary trees (ABTs) increase the occurrence of "tall" or "wide" blocks. The third bin indicates the tree-type of the partition, i.e., whether it is a binary-tree/triple-tree, or an asymmetric binary tree. In case of a binary-tree/triple-tree, the fourth bin indicates the type of the tree. In case of asymmetric binary trees, the four bin indicates up or down type for horizontally partitioned trees and right or left type for vertically partitioned trees.

1.5.1. Examples of Restrictions at Picture Borders

In some embodiments, if the CTB/LCU size is indicated by M×N (typically M is equal to N, as defined in HEVC/JEM), and for a CTB located at picture (or tile or slice or other kinds of types) border, K×L samples are within picture border.

Figure 12B:
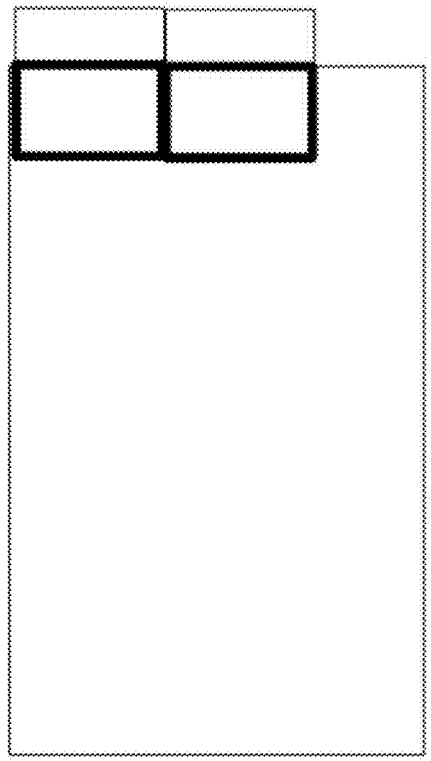
FIGS. 12A-12C show examples of CTBs crossing picture borders.
Figure 12C:
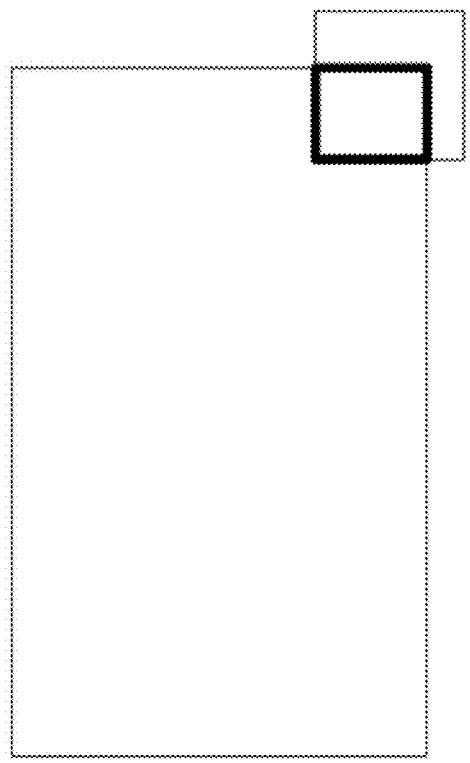
Figure 12A:
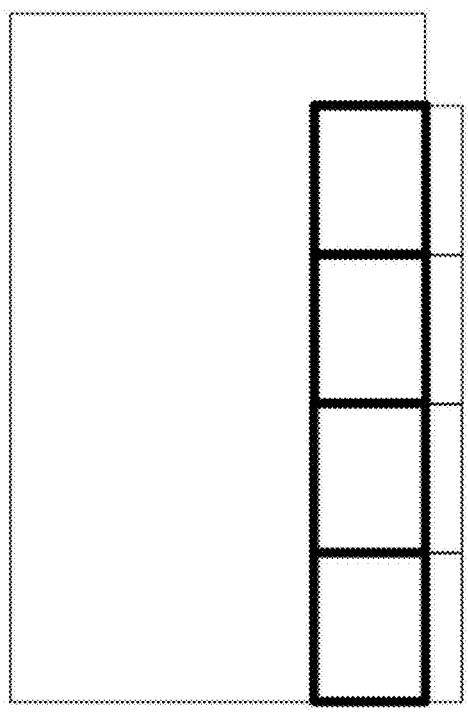
Figure 13E:
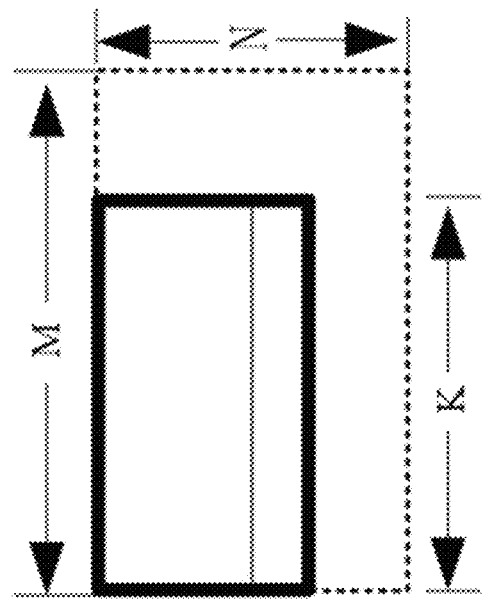
Figure 13D:
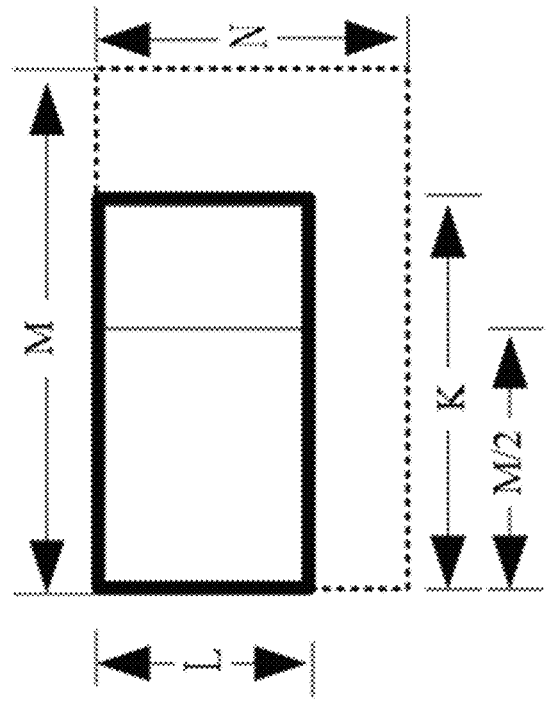
Figure 13G:
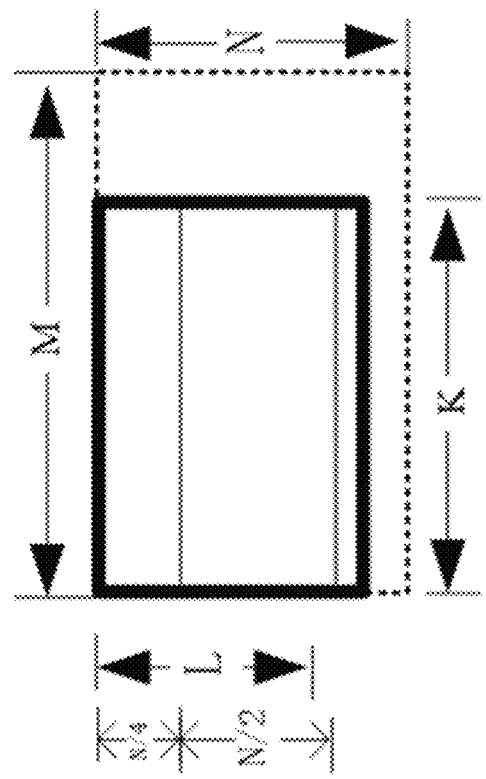
Figure 13F:
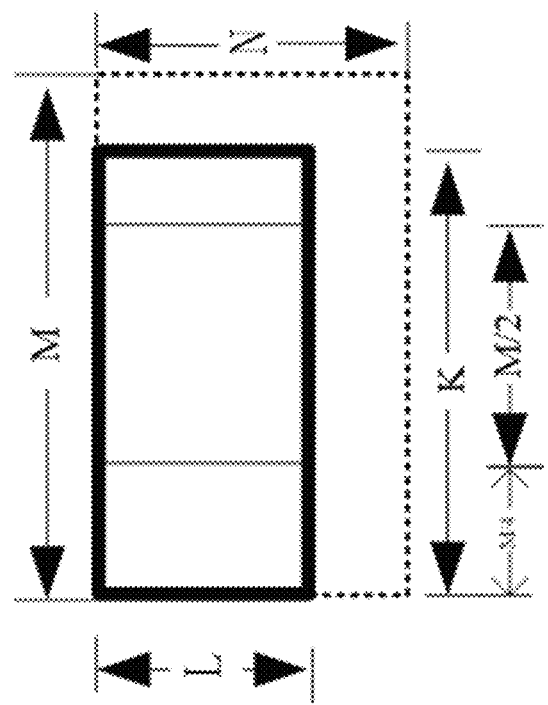

The CU splitting rules on the picture bottom and right borders may apply to any of the coding tree configuration QTBT+TT, QTBT+ABT or QTBT+TT+ABT. They include the two following aspects:
  (1) If a part of a given Coding Tree node (CU) is partially located outside the picture, then the binary symmetric splitting of the CU is always allowed, along the concerned border direction (horizontal split orientation along bottom border, as shown in FIG. 12A, vertical split orientation along right border, as shown in FIG. 12B). If the bottom-right corner of the current CU is outside the frame (as depicted in FIG. 12C), then only the quad-tree splitting of the CU is allowed. In addition, if the current binary tree depth is greater than the maximum binary tree depth and current CU is on the frame border, then the binary split is enabled to ensure the frame border is reached.
  (2) With respect to the ternary tree splitting process, the ternary tree split is allowed in case the first or the second border between resulting sub-CU exactly lies on the border of the picture. The asymmetric binary tree splitting is allowed if a splitting line (border between two sub-CU resulting from the split) exactly matches the picture border.

2. Examples of Existing Implementations for Picture Border Coding

Existing implementations handle frame/picture border when the CTB size is typically 64×64. However, existing implementations are not well suited to future video coding standards in which the CTB size may be 128×128 or even 256×256.

In one example, the HEVC design has avoided several bits for splitting flags when one block (partition) is outside picture borders. However, the forced quad-tree partitioning is used for border CTUs, which is not efficient. It may require several bits on signaling the mode/residual/motion information even two neighboring square partitions may prefer to be coded together.

In another example, when multiple types of partition structures are allowed, existing implementations (1) only allow split directions which are in parallel to the picture border the block extents over, and (2) restrict several partition patterns according to whether the right/bottom end of a block is outside the picture border. However, it should be noted that the splitting still starts from the whole CTB which is unreasonable due to the unavailable samples which are outside of picture border.

3. Example Methods for Picture Border Coding Based on the Disclosed Technology

Embodiments of the presently disclosed technology overcome the drawbacks of existing implementations, thereby providing video coding with higher efficiencies. Methods for picture border coding differentiate between CTBs or CBs on picture/tile/slice borders or boundaries (referred to as cross-CTBs or cross-CBs) which have samples outside of picture/tile/slice or other kinds of types borders or boundaries, and normal CTBs or CBs (with all samples within border).

For example, assume the CTB/LCU size is indicated by M×N (typically M is equal to N, as defined in HEVC/JEM), and for a CTB located at picture (or tile or slice or other kinds of types, in the invention below, picture border is taken as an example) border, a cross-CTB size is denoted by K×L ($K \leq M$ and $L \leq N$, but it is not permissible to have both K=M and L=N) wherein K columns and L rows of samples are within the picture border(s). Similarly, it may be assumed that a cross-CB size is denoted by K×L, and the size of the CB if it is not at the border is denoted by M×N, then K columns and L rows of samples are within the picture border.

The use of picture border coding to improve video coding efficiency and enhance both existing and future video coding standards is elucidated in the following examples described for various implementations. The examples of the disclosed technology provided below explain general concepts, and are not meant to be interpreted as limiting. In an example, unless explicitly indicated to the contrary, the various features described in these example may be combined. In another example, the various features described in these examples may be applied to other flexible and efficient partitioning techniques for video coding (e.g., using extended quadtrees (EQT) or flexible trees (FT)).

Example 1

Figure 15A:
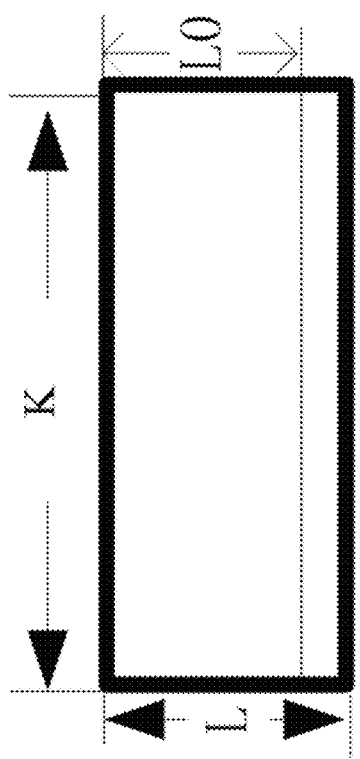
FIGS. 15A-15C show examples of subdividing a CTB that crosses a picture border.
Figure 15B:
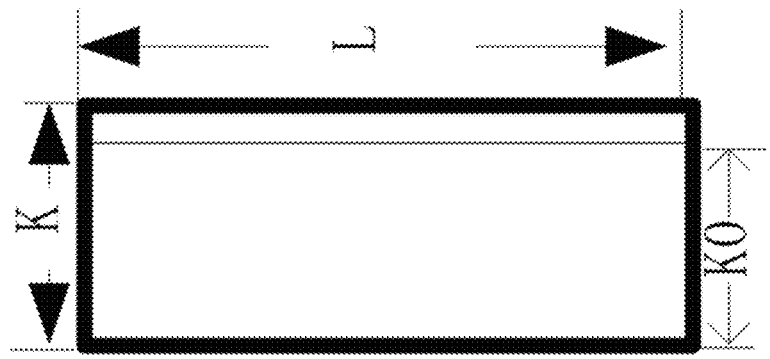
Figure 15C:
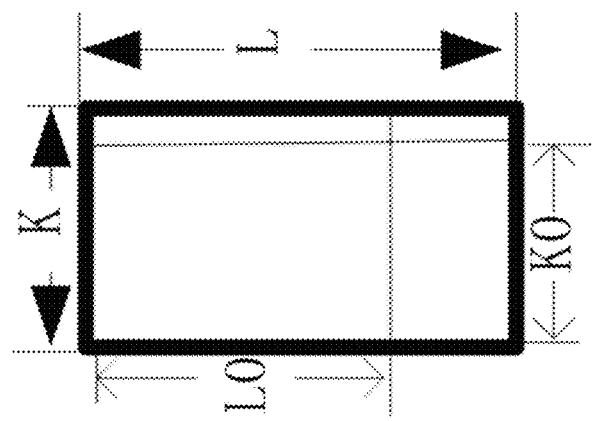

A split of one K×L cross-CTB is done automatically without being signaled wherein two or three partitions may be obtained based on the size relationship compared to the normal CTB.
  (a) In one example, if K is equal to M, two partitions are split without being signaled and one partition contains more/equal samples than the other partition. As shown in FIG. 15A, one partition size is set to K×L0 and the other one is set to K×(L−L0).
    (i) In one example, L0 is set to the maximally allowed value wherein K×L0 is allowed. Alternatively, L0 is set to the maximally allowed value wherein K×L0 and K×(L−L0) are both allowed.
    (ii) In one example, the larger partition size is set to (1<<a) wherein a satisfies (1<<a)<=K and (1<<(a+1))>K. Alternatively, furthermore, (1<<a)×Y or Y×(1<<a) is allowed in current picture/slice/tile etc. a is an integer.
    (iii) The other partition size is set to M×(L−(1<<a)).
  (b) In one example, if L is equal to N, two partitions are split without being signaled and one partition contains more/equal samples compared to the other one. As shown in FIG. 15B, one partition size is set to K0×L and the other one is set to (K−K0)×L.
    (i) In one example, K0 is set to the maximally allowed value (e.g., pre-defined or signaled in the bitstream) wherein K0×L is allowed. Alternatively, K0 is set to the maximally allowed value wherein K0×L and (K−K0)×L are both allowed.
    (ii) In one example, the larger partition size is set to (1<<b) wherein b satisfies (1<<b)<=L and (1<<(b+1))>L. Alternatively, furthermore, (1<<b)×Y or Y×(1<<b) is allowed in current picture/slice/tile etc. b is an integer.
    (iii) The other partition size is set to (K−(1<<b))×N.
  (c) Alternatively, furthermore, the two partitions may be placed from top-to-bottom when K is equal to M or K is larger than L; and/or the two partitions may be placed from left-to-right when L is equal to N or L is larger than K.
(d) Three partitions may apply, for example, when both K is unequal to M and L is unequal to N.

Example 2

The splitting may automatically terminate if the size of a node reaches a minimally allowed partition tree size. Alternatively, the splitting may automatically terminate if depth value of a partition tree reaches the maximally allowed depth.

Example 3

For blocks lying across picture borders, a smaller transform can be applied in order to fit the distribution of the residual data more closely. In one example, an 8×4 block may be used for the bottom of the picture while only top two sample rows remain within the picture, an 8×2 transform instead of 8×4 can be used. In one example, an 64×64 block may be used for the bottom of the picture while only top 48 sample rows remain within the picture, an 64×48 instead of 64×64 transform can be used.

Example 4

Luma and chroma components may use the same rule to handle the cross-CTBs. Alternatively, luma and chroma may be treated separately considering chroma components may prefer larger partitions.

Example 5

A set of allowed CTU or CU sizes (including square and/or non-square CTBs/CBs) may be utilized for a sequence/picture/slice/tile etc. In one example, furthermore, indices of allowed CTU sizes may be signaled.

Example 6

Note that with a certain partitioning type, the resulting partition may have size which is not aligned with the supported transforms, and the option of transform skip should be provided when such case occurs. In other words, when the partition size is not aligned with the supported transform, processing based on the transform skip mode may be performed without being signaled.

Example 7

When K×L is an allowed CTB or CU size (e.g., 64×48 is allowed when 64×64 is the CTB), tree partitions start from the K×L block instead of M×N block covering the K×L block. For example, K×L is set to be the CTB or CB instead of using M×N samples, the depth/level values for all kinds of partition trees are set to 0.
  (a) The contexts used in arithmetic coding (such as CABAC) of partitioning structures follow the way for coding normal CTBs or CBs.
  (b) In one example, in this case, all the allowed partitions for normal CTBs or CBs (e.g., QT, BT, TT and/or other partitions) are still valid. That is, the signaling is kept unchanged.
    (i) In one example, when QT is chosen for a X×Y block, it is split to four partitions with size equal to X/2×Y/2.
    (ii) Alternatively, EQT or other partition trees may be used to replace QT.
    (iii) Alternatively, it may be split into four/three/two partitions. However, the partition sizes may depend on the block size. Some examples of partitioning for the QT/BT/TT (i.e., four/two/three/partitions) structures are shown in FIGS. 13A-13G.
      1. Four sub-level CUs under the QT partition may be defined as: M/2×N/2, (K−M/2)×N/2, M/2×(L−N/2), (K−M/2)×(L−N/2).
      2. Alternatively, four sub-level CUs under the QT partition may be defined as: M/2×L/2, M/2×L/2, (K−M/2)×L/2, (K−M/2)×L/2. In one example, such a partition may be enabled when L is equal to N.
      3. Alternatively, sub-level CUs under the QT partition may be defined as: K/2×N/2, K/2×N/2, K/2×(L−N/2), K/2×(L−N/2). In one example, such a partition may be enabled when K is equal to M.
      4. Sub-level CUs in BT may be defined as: M/2×L, (K−M/2)×L.
      5. Sub-level CUs in BT may be defined as: K×N/2, K×(L−N/2).
      6. Sub-level CUs in TT may be defined as: M/4×L, M/2×L, (K−3M/4)×L.
      7. Sub-level CUs in TT may be defined as: K×N/4, K×N/2, K×(L−3N/4).
  (c) Alternatively, only a subset of partitions applied to normal CTBs/CBs are allowed for cross-CTBs/CBs. In this case, the indications of disallowed partitions are not transmitted.
    (i) In one example, horizontal splitting methods (the split sub-block has a larger width compared to height) may be applied if K/L is larger than a first threshold and/or vertical splitting methods (the split sub-block has a larger height compared to width) may be applied if L/K is larger than a second threshold.
    (ii) In one example, QT is not allowed if max (K, L)/min(K, L) is larger than a third threshold.
    (iii) Alternatively, QT is not allowed if either K is equal to M, and/or L is equal to N (as shown in FIGS. 12A and 12B). QT is not allowed if either K is less than M, and/or L is less than N.
    (iv) The first/second/third thresholds may be pre-defined or signaled in the bitstreams, such as signaled in sequence parameter set/picture parameter set/slice header etc. In one example, the three thresholds are set to 1.
  (d) The maximally and/or minimally allowed partition tree depths for cross-CTBs are shared with normal CTBs.
  (e) Alternatively, the maximally and/or minimally allowed partition tree depths are set differently compared to those used for normal CTBs. In one example, the maximally allowed partition tree depths for cross-CTBs may be reduced.

Example 8

When K×L is not an allowed CU size (e.g., 8×4 is disallowed when 256×256 is the CTB and minimally allowed BT size is 16×8; or 14×18), padding is applied to the K×L block to modify it to K'×L' wherein K'×L' is the allowed CU size.

(a) In one example, both width and height are padded. Alternatively, only one side (either width or height) is padded to the smallest K' (or L') when K'×K' or L'×L' is one of the allowed CU size.

(b) In one example, K'×L' may be treated in the same way as in (a).

(c) K' is set to $2^a$ wherein a satisfies $2^a \geq K$ and $2^{a-1} < K$. Alternatively, furthermore, partitions $2^a \times Y$ or $Y \times 2^a$ (Y is a positive integer value) is allowed in current picture/slice/tile etc.

(d) L' is set to $2^b$ wherein b satisfies $2^b \geq L$ and $2^{b-1} < L$. Alternatively, furthermore, partitions $2^b \times Y$ or $Y \times 2^b$ (Y is a positive integer value) is allowed in current picture/slice/tile etc.

Figure 14:
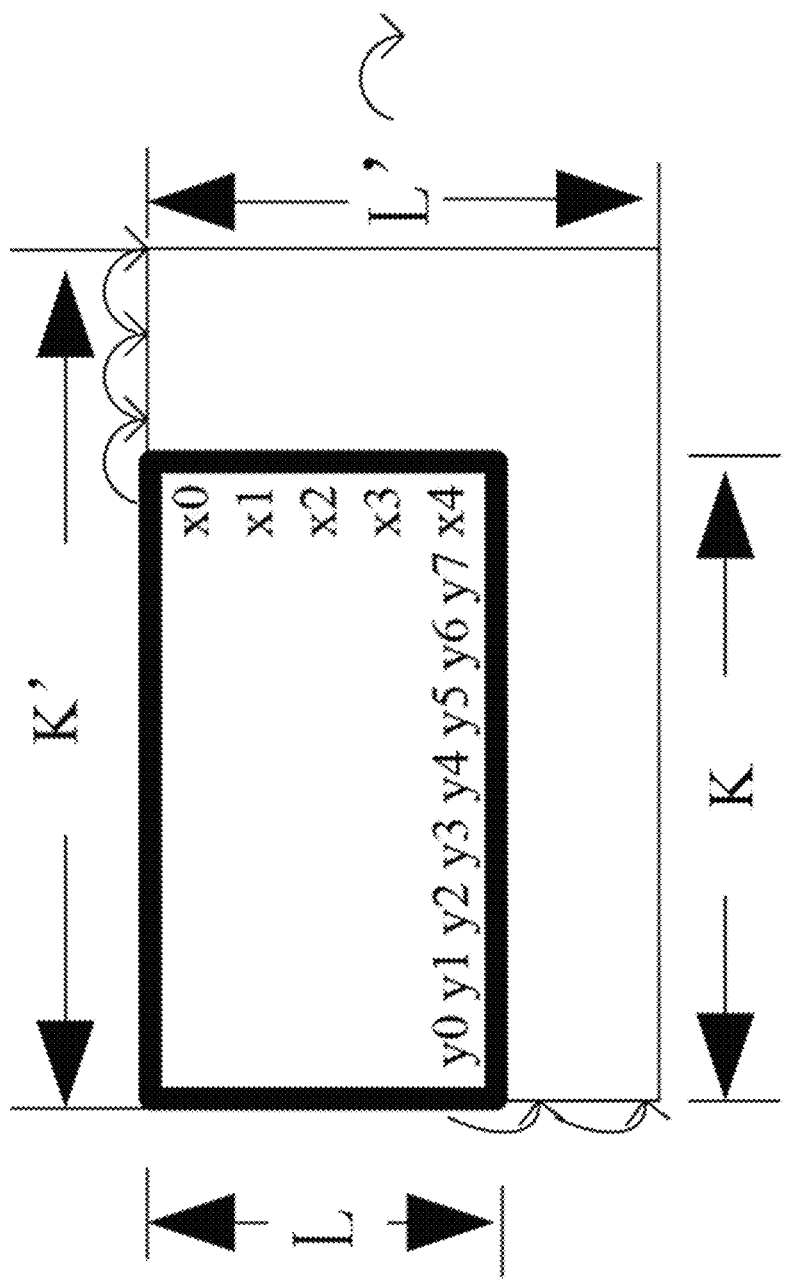
FIG. 14 shows an example of padding a coding unit (CU).

(e) The existing simple padding methods (e.g., repeating outmost available samples as shown in FIG. 14) may be applied. In another example, mirrored repetition may be applied (i.e., p(K+i, L+j)=p(K−i, L−j)). In another example, any motion-compensation based pixel padding may be applied. Regular procedure of coefficient coding is applicable to the supported transform size for each dimension individually. Note that in principle, the intention for padding is to fit the padded block size to the supported transform sizes, and hence the extra coding overhead because of padding should be minimized.

(f) Alternatively, for prediction, only the original K×L block should be considered, and hence the residual part in the padded region can be considered to have zero-valued residuals. In addition, a filtering process can be applied to smooth the pseudo boundary between the actual samples and the padded samples, so as to reduce the cost of coding coefficients which includes contributions from the padded samples. Alternatively, transform skip may be applied to eliminate the hurdle of padding, especially when K and L are relatively small.

(g) For CTBs/CBs lying across picture borders, coefficient scan may occur by considering the entire K'×L' block as a scanning unit, instead of using the conventional concept of Coefficient Group (CG). Scanning orders such as zig-zag or up-right diagonal scans can be easily adapted based on the K'×L' block size.

Example 9

In one example, if K×L (or reshaped K×L) is an available transform shape, K×L boundary block is considered as a valid CU, and is coded the same as other leaf CU nodes in partition trees.

The examples described above may be incorporated in the context of the methods described below, e.g., methods 1600-1900, which may be implemented at a video decoder and/or video encoder.

Figure 16:
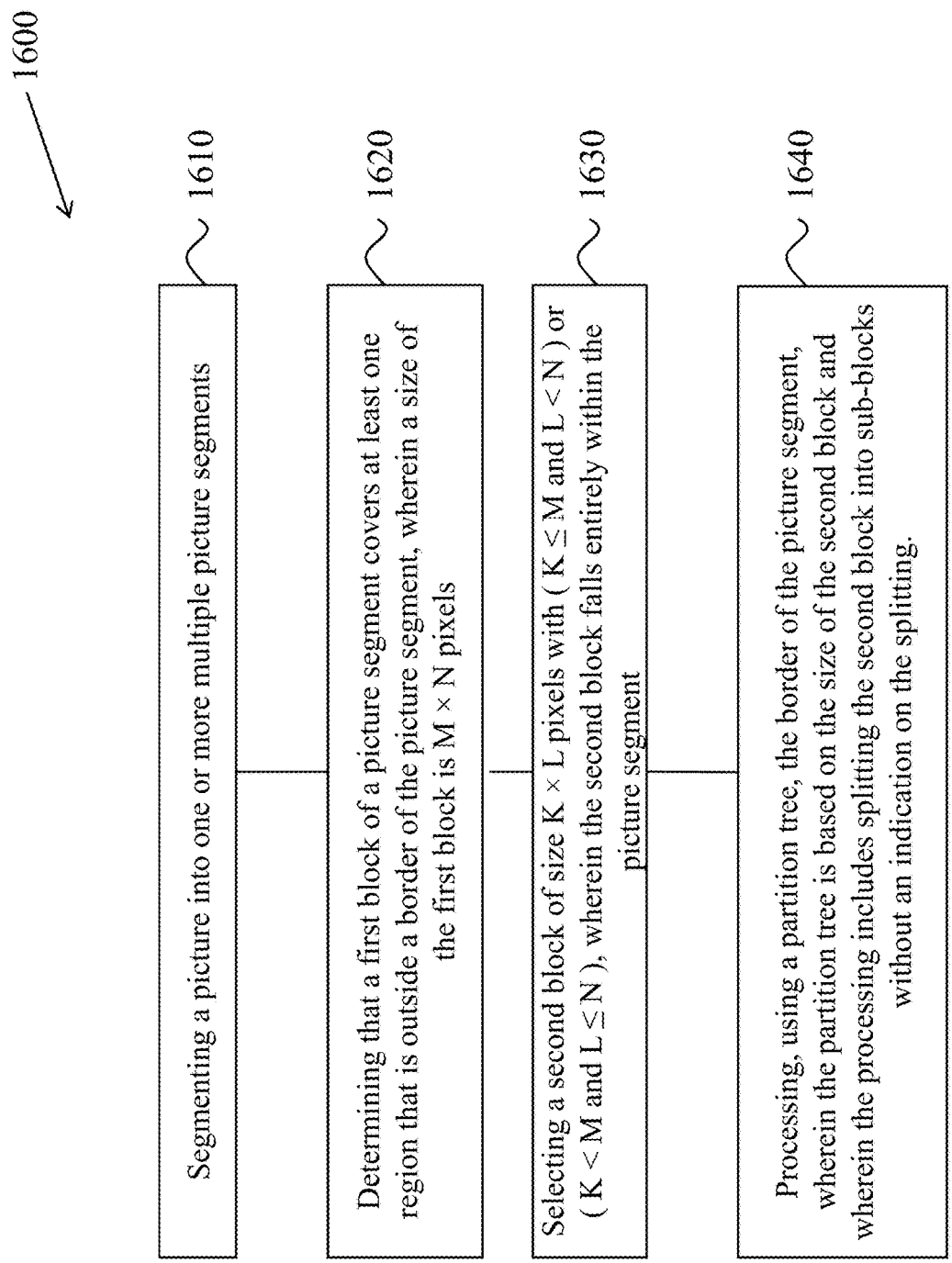
FIGS. 16-22 show flowcharts of examples of a method for processing pictures in accordance with the presently disclosed technology.

FIG. 16 shows a flowchart of an exemplary method for processing pictures. The method 1600 includes, at step 1610, segmenting a picture into one or more multiple picture segments.

The method 1600 includes, at step 1620, determining that a first block, of size M×N pixels, of a picture segment covers at least one region that is outside a border of the picture segment.

The method 1600 includes, at step 1630, selecting a second block of size K×L pixels, where (K≤M and L<N) or (K<M and L≤N), wherein the second block falls entirely within the picture segment.

The method 1600 includes, at step 1640, processing, using a partition tree, the border of the picture segment, wherein the partition tree is based on the size of the second block and wherein the processing includes splitting the second block into sub-blocks without an indication of the splitting.

Figure 17:
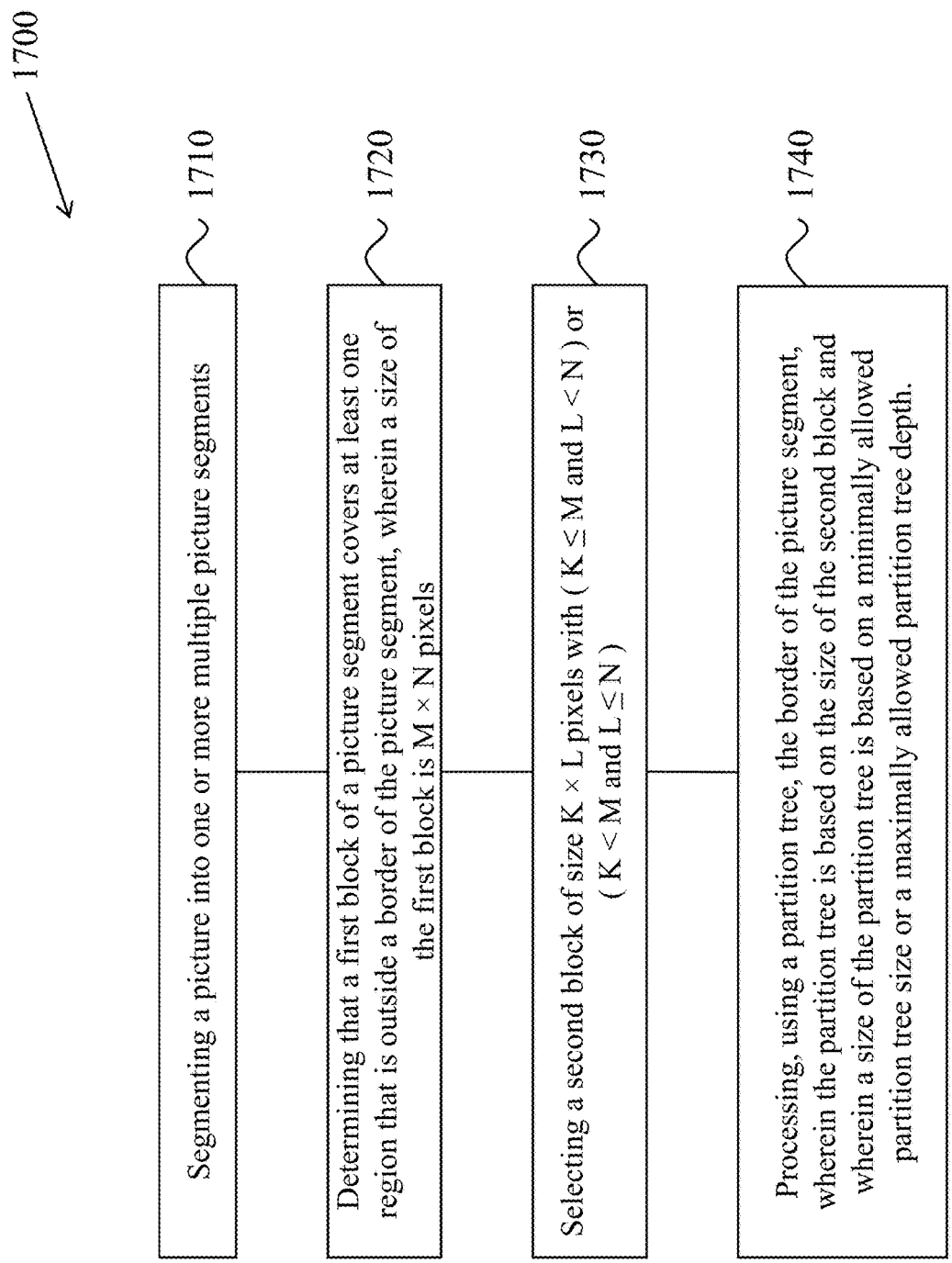

FIG. 17 shows a flowchart of another exemplary method for processing pictures. This flowchart includes some features and/or steps that are similar to those shown in FIG. 16 and described above. At least some of these features and/or steps may not be separately described in this section.

The method 1700 includes, at step 1710, segmenting a picture into one or more multiple picture segments.

The method 1700 includes, at step 1720, determining that a first block, of size M×N pixels, of a picture segment covers at least one region that is outside a border of the picture segment.

The method 1700 includes, at step 1730, selecting a second block of size K×L pixels, wherein (K≤M and L<N) or (K<M and L≤N).

The method 1700 includes, at step 1740, processing, using a partition tree, the border of the picture segment, wherein the partition tree is based on the size of the third block and wherein a size of the partition tree is based on minimally allowed partition tree size or a maximally allowed partition tree depth.

At step 1640 and 1740 of FIGS. 16 and 17, the processing may comprise encoding the picture into a bitstream representation based on the partition tree.

Figure 18:
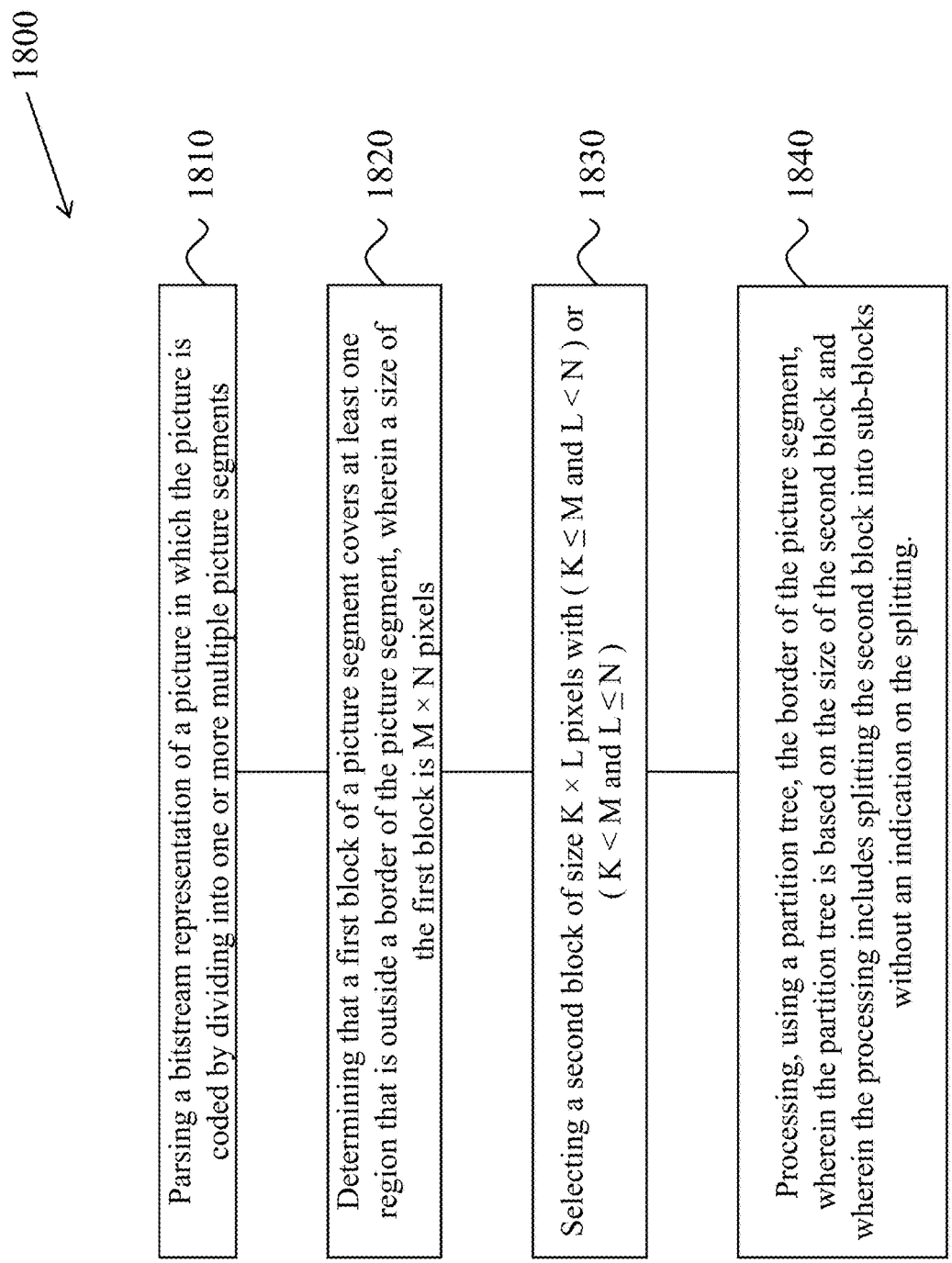

FIG. 18 shows a flowchart of an exemplary method for processing pictures. The method 1800 includes, at step 1810, parsing a bitstream representation of a picture in which the picture is coded by dividing into one or more multiple picture segments.

The method 1800 includes, at step 1820, determining that a first block, of size M×N pixels, of a picture segment covers at least one region that is outside a border of the picture segment.

The method 1800 includes, at step 1830, selecting a second block of size K×L pixels, where (K≤M and L<N) or (K<M and L≤N).

The method 1800 includes, at step 1840, processing, using a partition tree, the border of the picture segment, wherein the partition tree is based on the size of the second block and wherein the processing includes splitting the second block into sub-blocks without an indication of the splitting.

Figure 19:
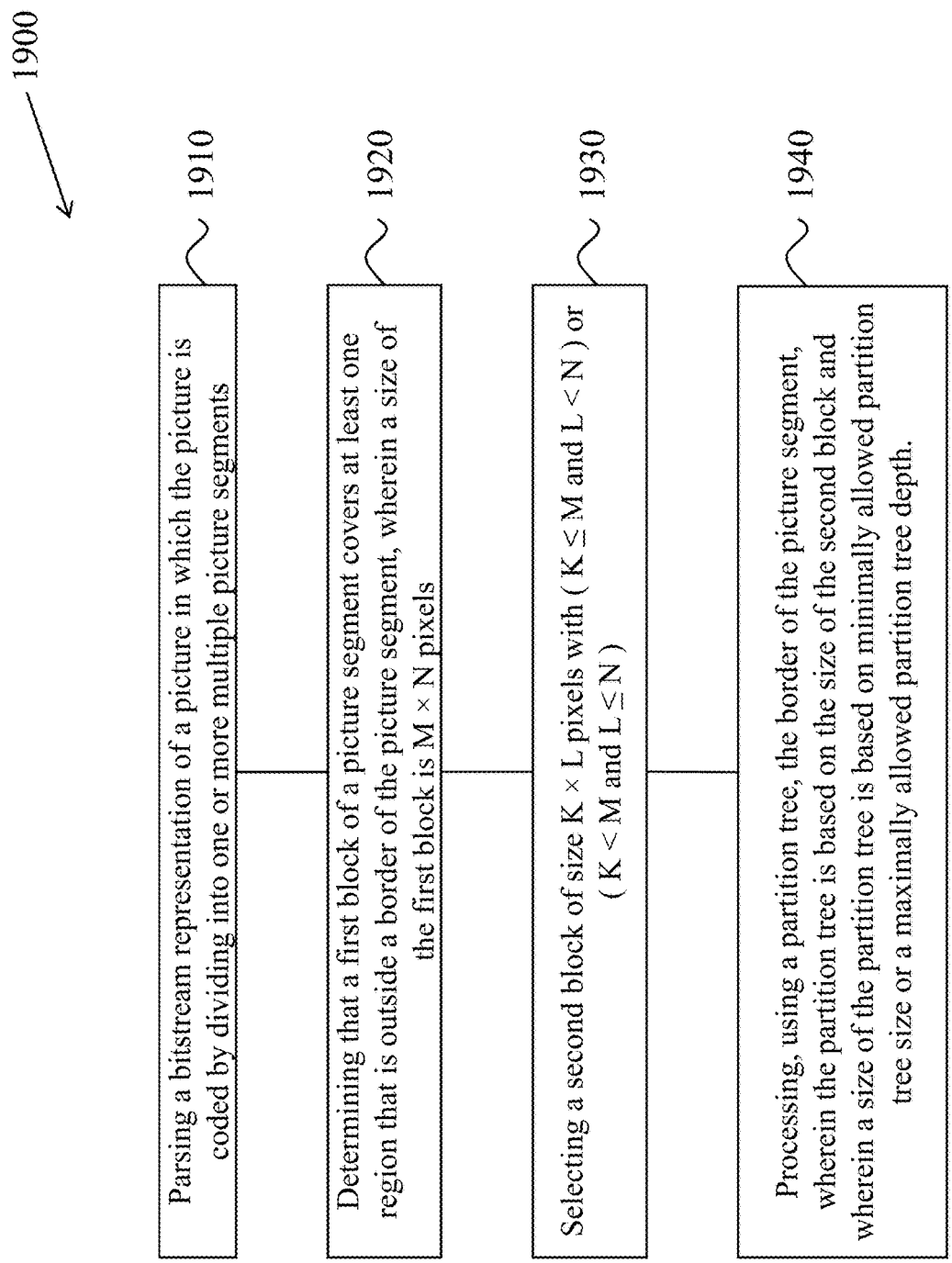

FIG. 19 shows a flowchart of another exemplary method for processing pictures. This flowchart includes some features and/or steps that are similar to those shown in FIG. 16 and described above. At least some of these features and/or steps may not be separately described in this section.

The method 1900 includes, at step 1910, parsing a bitstream representation of a picture in which the picture is coded by dividing into multiple picture segments.

The method 1900 includes, at step 1920, determining that a first block, of size M×N pixels, of a picture segment covers at least one region that is outside a border of the picture segment.

The method 1900 includes, at step 1930, selecting a second block of size K×L pixels, wherein (K≤M and L<N) or (K<M and L≤N).

The method 1900 includes, at step 1940, processing, using a partition tree, the border of the picture segment, wherein the partition tree is based on the size of the third block and wherein a size of the partition tree is based on minimally allowed partition tree size or a maximally allowed partition tree depth.

Figure 20:
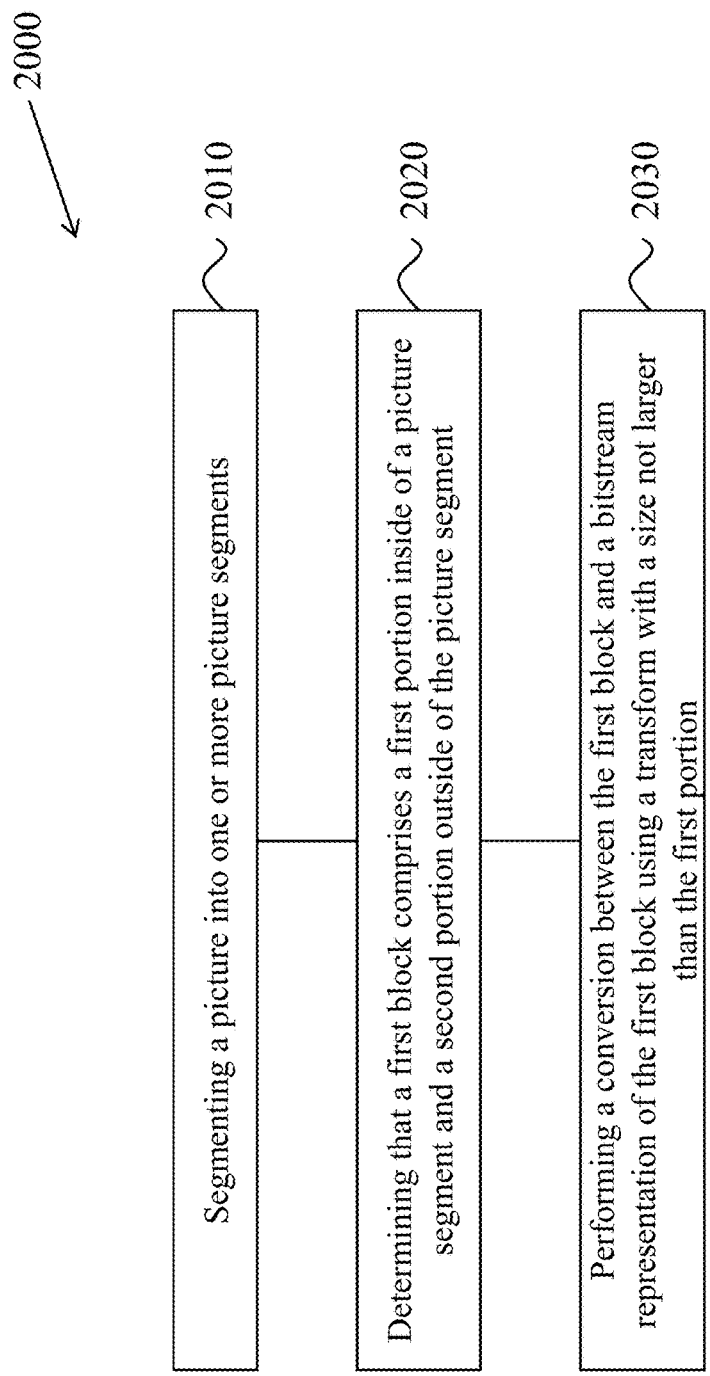

FIG. 20 shows a flowchart of another exemplary method for processing pictures.

The method 2000 includes, at step 2010, segmenting a picture into one or more picture segments.

The method 2000 includes, at step 2020, determining that a first block comprises a first portion inside of a picture segment and a second portion outside of the picture segment.

The method 2000 includes, at step 2030, performing a conversion between the first block and a bitstream representation of the first block using a transform with a size not larger than the first portion.

Figure 21:
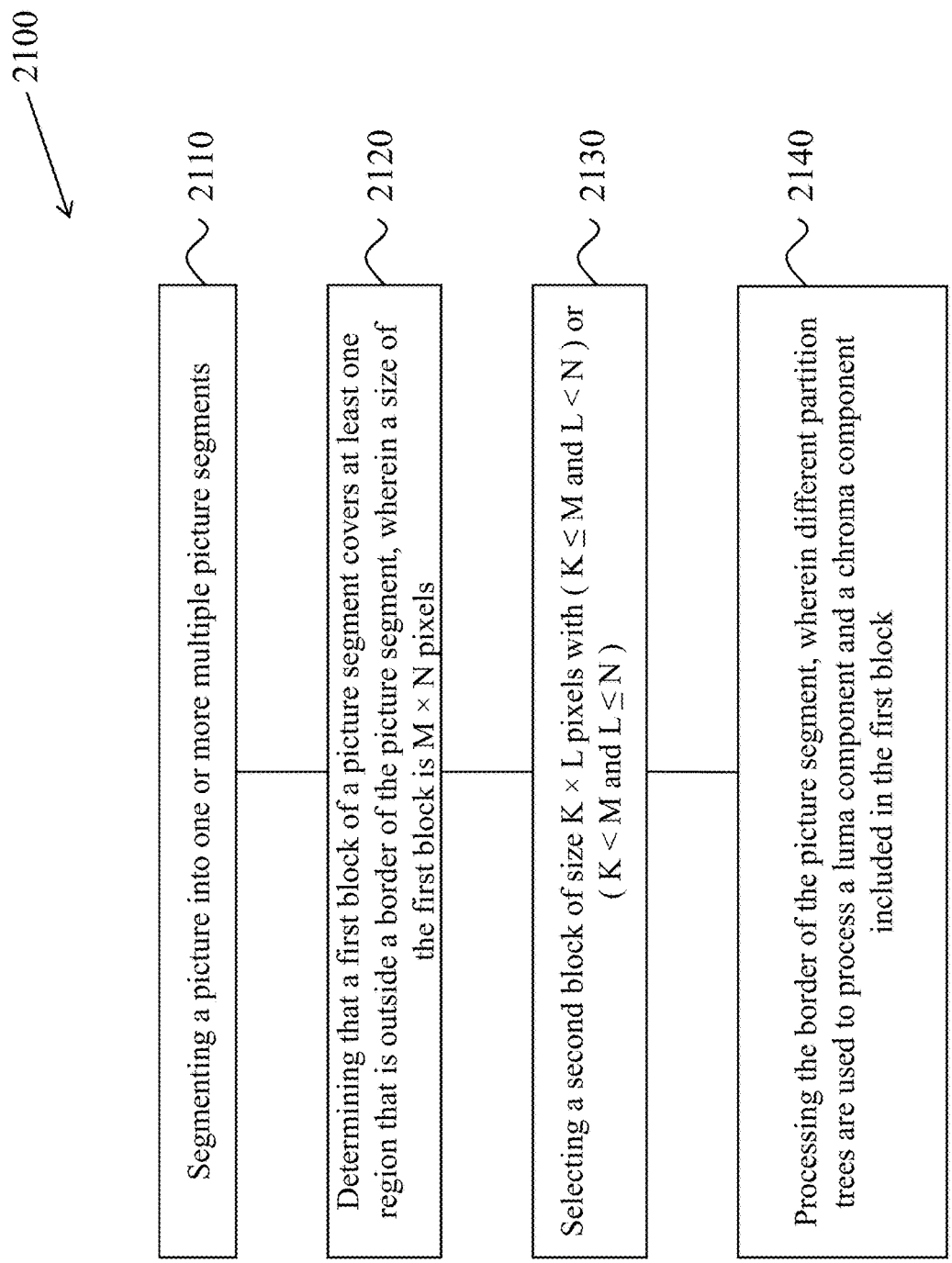

FIG. 21 shows a flowchart of another exemplary method for processing pictures.

The method 2100 includes, at step 2110, segmenting a picture into one or more picture segments.

The method 2100 includes, at step 2120, determining that a first block of a picture segment covers at least one region that is outside a border of the picture segment, wherein a size of the first block is M×N pixels.

The method 2100 includes, at step 2130, selecting a second block of size K×L pixels, wherein (K≤M and L<N) or (K<M and L≤N).

The method 2100 includes, at step 2140, processing the border of the picture segment, wherein different partition trees are used to process a luma component and a chroma component included in the first block.

Figure 22:
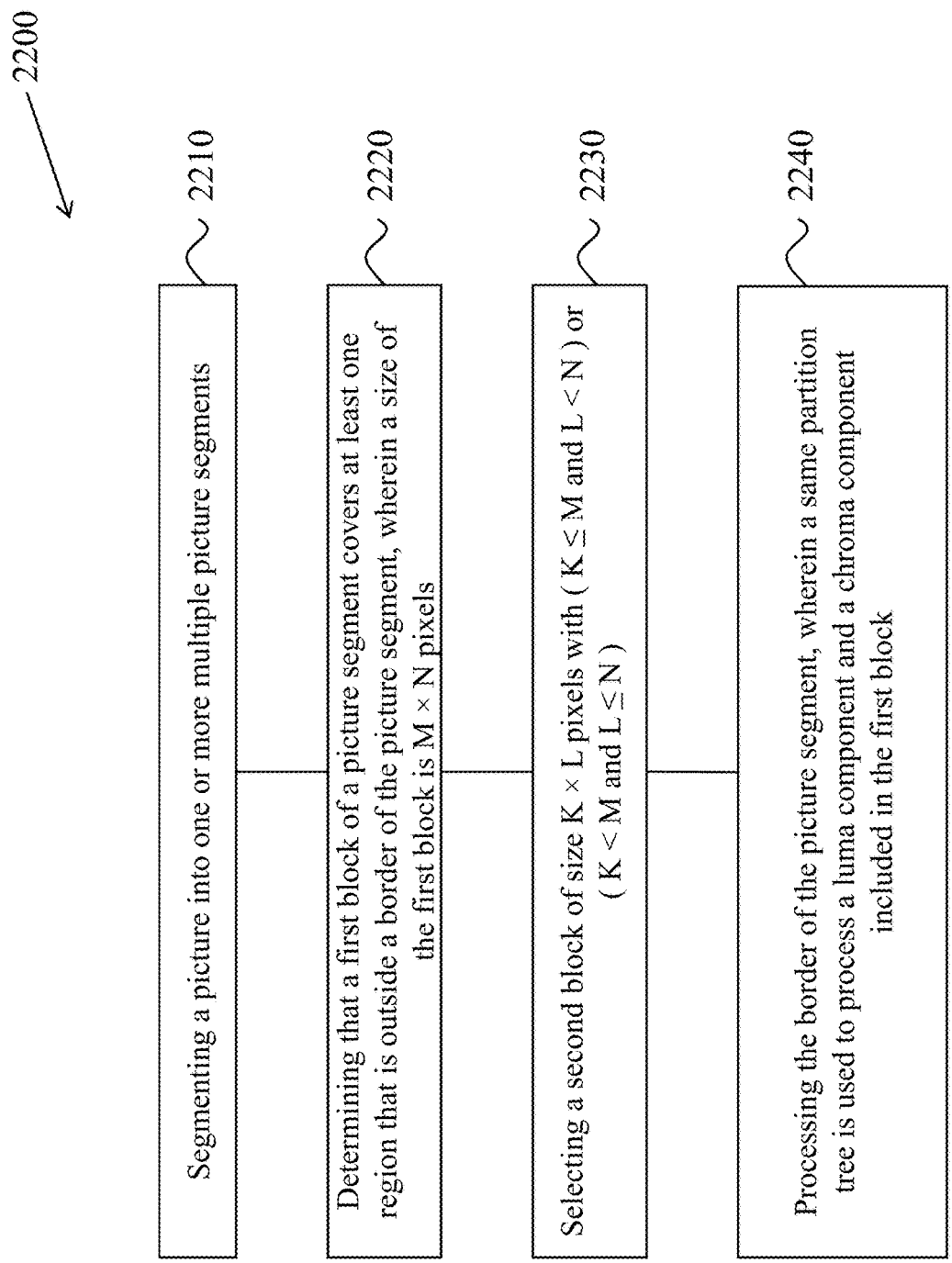

FIG. 22 shows a flowchart of another exemplary method for processing pictures.

The method 2200 includes, at step 2210, segmenting a picture into one or more picture segments.

The method 2200 includes, at step 2220, determining that a first block of a picture segment covers at least one region that is outside a border of the picture segment, wherein a size of the first block is M×N pixels.

The method 2200 includes, at step 2230, selecting a second block of size K×L pixels, wherein (K≤M and L<N) or (K<M and L≤N).

The method 2200 includes, at step 2240, processing the border of the picture segment, wherein a same partition tree is used to process a luma component and a chroma component included in the first block.

In the flowcharts in FIGS. 16-22, the processing may comprise decoding a bitstream representation based on the partition tree to generate pixel values of the picture.

The methods shown in FIGS. 16-22 can be implemented in various manners to include following modifications/variations. In some implementations, the second block satisfies at least one of the conditions (i) that the second block falls entirely within the picture segment, (ii) that the second block has a size that is backward compatible with a video coding standard, and (iii) that the second block is used as a largest coding unit, a leaf coding block or a coding tree block. In some embodiments, backward compatibility may be defined as those transform or coding block sizes that are allowed for M×N blocks (e.g., sizes allowed for CTUs that are fully located within the picture, slice, or tile borders). In other embodiments, backward compatibility may be defined as operating seamlessly with existing video coding standards that include, but are not limited to, the H.264/AVC (Advanced Video Coding) standard, the H.265/HEVC (High Efficiency Video Coding) standard, or the Scalable HEVC (SHVC) standard.

In some embodiments, the processing includes using context-adaptive binary adaptive coding (CABAC). In other embodiments, parameters corresponding to the partition tree may be communicated using signaling that is backward compatible with the video coding standard.

The methods 1600-2200 may further include communicating block sizes (or their corresponding indices) that are backward compatible with existing video coding standards.

In some embodiments, the method 1600-2200 may further comprise determining that the size of the second block is not backward compatible with a video coding standard. In some implementations, the method 1600-2200 may further comprise selecting a third block of size K'×L' pixels by padding one or both dimensions of the second block, wherein K≤K' and L≤L', and wherein the size of the third block is backward compatible with the video coding standard, and wherein the third block is a largest coding unit, a leaf coding block or a coding tree block In some embodiments, the partition tree is further based on a size of a fourth block that falls entirely within the picture segment, where the size of the fourth block is smaller than the size of the second block, where the indication of the splitting is excluded from the processing, and where a size of at least one of those sub-blocks is identical to the size of the fourth block.

The methods 1600-2200, described in the context of FIGS. 16-22, may further include the first block being a coding tree unit (CTU), a coding unit (CU), a prediction unit (PU) or a transform unit (TU). In some embodiments, the CTU may include a luma coding tree block (CTB) and two corresponding chroma CTBs. In one example, a partition tree for the luma CTB is identical to the partition tree for at least one of the two corresponding chroma CTBs. In another example, a partition tree for the luma CTB is different from a partition tree for the corresponding chroma CTB, and the partition tree for the corresponding chroma CTB includes partitions that are larger than partitions in the partition tree for the luma CTB. In other embodiments, the partition tree based on the size of the second block is different from a partition tree based on a fifth block that falls entirely within the picture segment. In some implementations, the picture segment is a slice or a tile.

In some embodiments, the method 1600-2200 further comprise communicating block sizes that are backward compatible with a video coding standard. In some implementations, the method 1600-2200 further comprise communicating indices corresponding to block sizes that are backward compatible with a video coding standard. In some implementations, the video coding standard is an H.264/AVC (Advanced Video Coding) standard or an H.265/HEVC (High Efficiency Video Coding) standard.

4. Example Implementations of the Disclosed Technology

Figure 23:
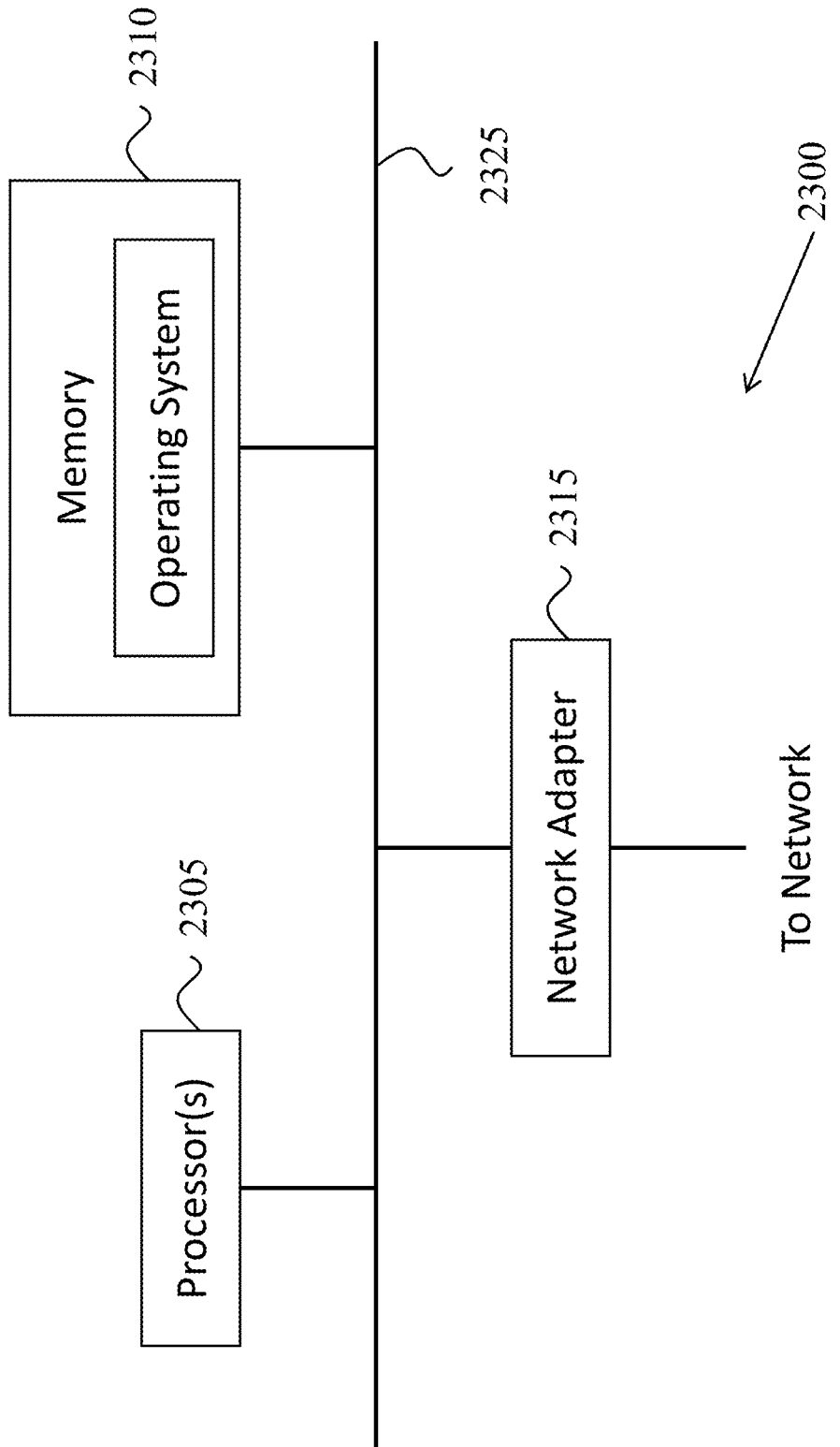
FIG. 23 is a block diagram illustrating an example of the architecture for a computer system or other control device that can be utilized to implement various portions of the presently disclosed technology.

FIG. 23 is a block diagram illustrating an example of the architecture for a computer system or other control device 2300 that can be utilized to implement various portions of the presently disclosed technology, including (but not limited to) method 1600-2200. In FIG. 23, the computer system 2300 includes one or more processors 2305 and memory 2310 connected via an interconnect 2325. The interconnect 2325 may represent any one or more separate physical buses, point to point connections, or both, connected by appropriate bridges, adapters, or controllers. The interconnect 2325, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2305 may include central processing units (CPUs) to control the overall operation of, for example, the host computer. In certain embodiments, the processor(s) 2305 accomplish this by executing software or firmware stored in memory 2310. The processor(s) 2305 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2310 can be or include the main memory of the computer system. The memory 2310 represents any suitable form of random access memory (RAM), read-only memory (ROM), flash memory, or the like, or a combination of such devices. In use, the memory 2310 may contain, among other things, a set of machine instructions which, when executed by processor 2305, causes the processor 2305 to perform operations to implement embodiments of the presently disclosed technology.

Also connected to the processor(s) 2305 through the interconnect 2325 is a (optional) network adapter 2315. The network adapter 2315 provides the computer system 2300 with the ability to communicate with remote devices, such as the storage clients, and/or other storage servers, and may be, for example, an Ethernet adapter or Fiber Channel adapter.

Figure 24:
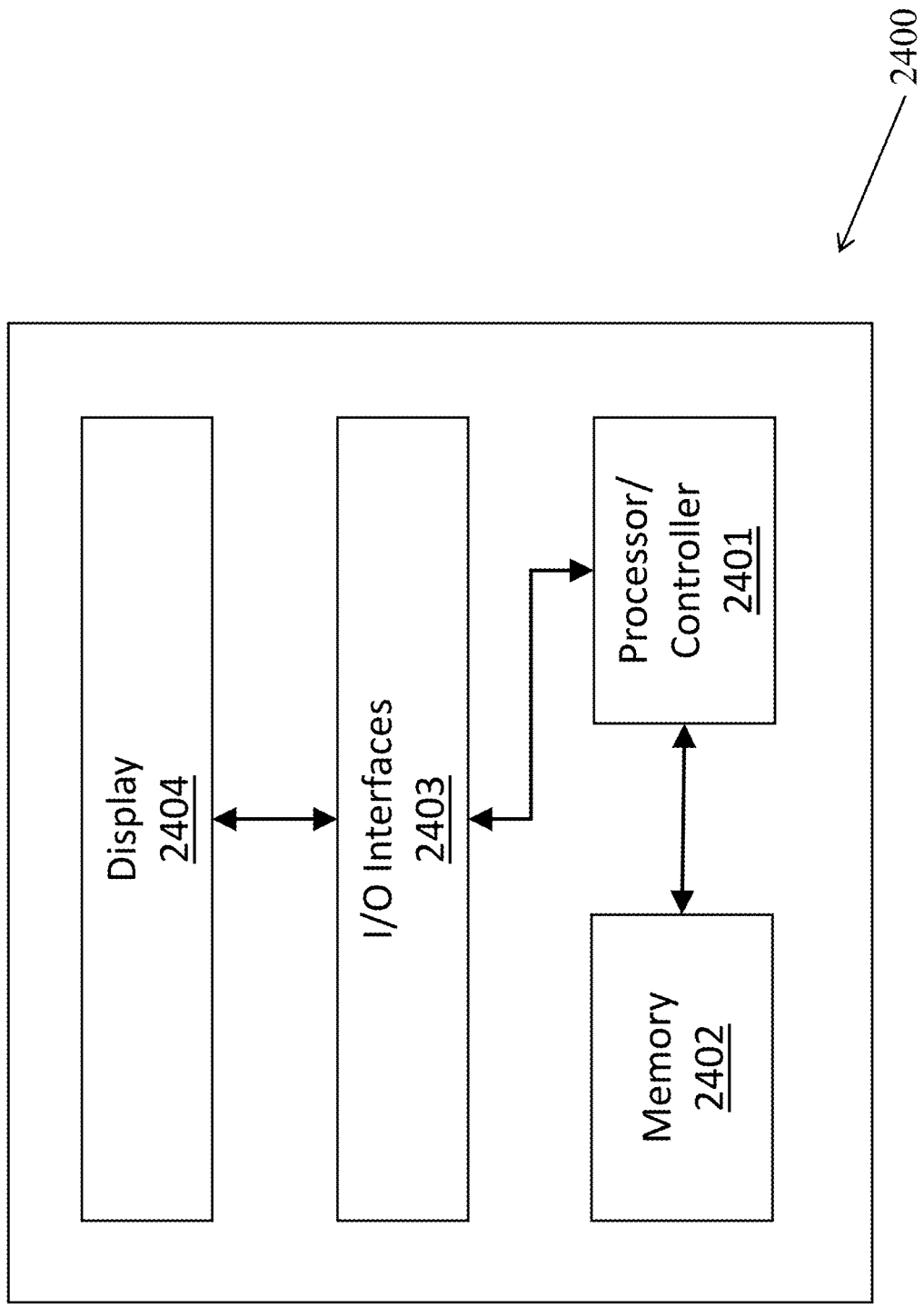
FIG. 24 shows a block diagram of an example embodiment of a mobile device that can be utilized to implement various portions of the presently disclosed technology.

FIG. 24 shows a block diagram of an example embodiment of a mobile device 2100 that can be utilized to implement various portions of the presently disclosed technology, including (but not limited to) method 1600-1900. The mobile device 2400 can be a laptop, a smartphone, a tablet, a camcorder, or other types of devices that are capable of processing videos. The mobile device 2400 includes a processor or controller 2401 to process data, and memory 2402 in communication with the processor 2101 to store and/or buffer data. For example, the processor 2401 can include a central processing unit (CPU) or a microcontroller unit (MCU). In some implementations, the processor 2401 can include a field-programmable gate-array (FPGA). In some implementations, the mobile device 2400 includes or is in communication with a graphics processing unit (GPU), video processing unit (VPU) and/or wireless communications unit for various visual and/or communications data processing functions of the smartphone device. For example, the memory 2402 can include and store processor-executable code, which when executed by the processor 2401, configures the mobile device 2400 to perform various operations, e.g., such as receiving information, commands, and/or data, processing information and data, and transmitting or providing processed information/data to another device, such as an actuator or external display.

To support various functions of the mobile device 2400, the memory 2402 can store information and data, such as instructions, software, values, images, and other data processed or referenced by the processor 2401. For example, various types of Random Access Memory (RAM) devices, Read Only Memory (ROM) devices, Flash Memory devices, and other suitable storage media can be used to implement storage functions of the memory 2402. In some implementations, the mobile device 2400 includes an input/output (I/O) unit 2103 to interface the processor 2401 and/or memory 2402 to other modules, units or devices. For example, the I/O unit 2403 can interface the processor 2401 and memory 2402 with to utilize various types of wireless interfaces compatible with typical data communication standards, e.g., such as between the one or more computers in the cloud and the user device. In some implementations, the mobile device 2400 can interface with other devices using a wired connection via the I/O unit 2403. The mobile device 2400 can also interface with other external interfaces, such as data storage, and/or visual or audio display devices 2404, to retrieve and transfer data and information that can be processed by the processor, stored in the memory, or exhibited on an output unit of a display device 2404 or an external device. For example, the display device 2404 can display a video frame that includes a block (a CU, PU or TU) that applies the intra-block copy based on whether the block is encoded using a motion compensation algorithm, and in accordance with the disclosed technology.

In some embodiments, a video decoder apparatus may implement a method of picture border coding as described herein is used for video decoding. The various features of the method may be similar to the above-described methods 1600-2200.

In some embodiments, the video decoding methods may be implemented using a decoding apparatus that is implemented on a hardware platform as described with respect to FIG. 23 and FIG. 24.

Features and embodiments of the above-described methods/techniques are described below.

1. A method for processing pictures, comprising: segmenting a picture into one or multiple picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N) and the second block falls entirely within the picture segment; processing, using a partition tree, the border of the picture segment, wherein the partition tree is based on the size of the second block, and wherein the processing includes splitting the second block into sub-blocks without an indication on the splitting.

2. A method for processing pictures, comprising: segmenting a picture into one or multiple picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N); and processing, using a partition tree, the border of the picture segment, wherein the partition tree is based on the size of the second block, and wherein a size of the partition tree is based on a minimally allowed partition tree size or a maximally allowed partition tree depth.

3. The method of clause 1 or 2, wherein the processing comprises encoding the picture into a bitstream representation based on the partition tree.

4. A method of processing pictures, comprising: parsing a bitstream representation of a picture in which the picture is coded by dividing into one or multiple picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N); and processing, using a partition tree, the border of the picture segment, wherein the partition tree is based on the size of the second block, and wherein the processing includes splitting the second block into sub-blocks without an indication on the splitting.

5. A method of processing pictures, comprising: parsing a bitstream representation of a picture in which the picture is coded by dividing into multiple picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N); and processing, using a partition tree, the border of the picture segment, wherein the partition tree is based on the size of the second block, and wherein a size of the partition tree is based on a minimally allowed partition tree size or a maximally allowed partition tree depth.

6. The method of clause 4 or 5, wherein the processing comprises decoding a bitstream representation based on the partition tree to generate pixel values of the picture.

7. The method of any one of clause 1, 2, 4 or 5, wherein the second block satisfies at least one of conditions that (i) the second block falls entirely within the picture segment, (ii) the second block has a size that is backward compatible with a video coding standard, or (iii) the second block is a largest coding unit, a leaf coding block or a coding tree block.

8. The method of any one of clause 1, 2, 4 or 5, the method further comprises: determining that the size of the second block is not backward compatible with a video coding standard.

9. The method of any of clause 1, 2, 4 or 5, further comprising: selecting a third block of size K'×L' pixels by padding one or both dimensions of the second block, wherein K≤K' and L≤L', and wherein the size of the third block is backward compatible with a video coding standard, and wherein the third block is a largest coding unit, a leaf coding block or a coding tree block.

10. The method of any of clause 1, 2, 4, or 5, wherein the partition tree is further based on a size of a fourth block, wherein the fourth block falls entirely within the picture segment, wherein the size of the fourth block is smaller than the size of the second block, wherein the indication of the splitting is excluded from the processing, and wherein a size of at least one of the sub-blocks is identical to the size of the fourth block.

11. The method of any of clause 1, 2, 4, or 5, further comprising: communicating block sizes that are backward compatible with a video coding standard.

12. The method of any of clause 1, 2, 4, or 5, further comprising: communicating indices corresponding to block sizes that are backward compatible with a video coding standard.

13. The method of any of clause 7, 8, 9, or 11, wherein the video coding standard is an H.264/AVC (Advanced Video Coding) standard or an H.265/HEVC (High Efficiency Video Coding) standard or a VVC (Versatile Video Coding) standard.

14. The method of any of clause 1, 2, 4, or 5, wherein the first block is a coding tree unit (CTU), a coding unit (CU), a prediction unit (PU), or a transform unit (TU).

15. The method of clause 14, wherein the CTU comprises a luma coding tree block (CTB) and two corresponding chroma CTBs.

16. The method of clause 15, wherein a partition tree for the luma CTB is identical to the partition tree for at least one of the two corresponding chroma CTBs.

17. The method of clause 15, wherein a partition tree for the luma CTB is different from a partition tree for the corresponding chroma CTB.

18. The method of clause 17, wherein the partition tree for the corresponding chroma CTB comprises partitions that are larger than partitions in the partition tree for the luma CTB.

19. A method of processing pictures, comprising: segmenting a picture into one or more picture segments; determining that a first block comprises a first portion inside of a picture segment and a second portion outside of the picture segment; and performing a conversion between the first block and a bitstream representation of the first block using a transform with a size not larger than the first portion.

20. The method of clause 19, wherein the first block is a coding tree block or a coding tree unit.

21. The method of clause 19, wherein the first block is a coding unit or a coding block.

22. The method of clause 19, wherein the size of the transform has a same height as that of the first portion of the first block.

23. The method of clause 19, wherein the size of the transform has a same width as that of the first portion of the first block.

24. The method of clause 19, further comprising signaling a transform coefficient and the signaling of the transform coefficient is based on the size of the transform instead of a size of the first block.

25. The method of clause 19, further comprising: selecting a second block; determining that the second block fully inside of the picture segment; and performing a conversion between the second block and a bitstream representation of the second block using a transform with a size equal to the size of the second block.

26. The method of clause 25, further comprising signaling a transform coefficient for the second block and the signaling of the transform coefficient is based on the size of the second block.

27. A method of processing pictures, comprising: segmenting a picture into one or more picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N); and processing the border of the picture segment, and wherein different partition trees are used to process a luma component and a chroma component included in the first block.

28. The method of clause 27, wherein a partition tree for the chroma component includes partitions that are larger than partitions in a partition tree for the luma component.

29. A method of processing pictures, comprising: segmenting a picture into one or more picture segments; determining that a first block of a picture segment covers at least one region that is outside a border of the picture segment, wherein a size of the first block is M×N pixels; selecting a second block of size K×L pixels, wherein (K≤M and L<N) or (K<M and L≤N); and processing the border of the picture segment, and wherein a same partition tree is used to process a luma component and a chroma component included in the first block.

30. A method of processing pictures, comprising: selecting a first block in a first picture with M×N samples; and selecting a second block in a second picture with K×L samples, wherein K×L is unequal to M×N, and wherein the first block is processed using a partition tree split from the M×N samples and the second block is processed using another partition tree split from the K×L samples.

31. The method of clause 29 or 30, wherein the allowed sizes of the first and second blocks are predefined or signaled.

32. The method of clause 29 or 30, wherein the first block and the second block are coding tree units or coding tree block.

33. The method of clause 29 or 30, wherein M is unequal to N.

34. The method of clause 29 or 30, wherein M is equal to N.

35. The method of clause 29 or 30, wherein K is unequal to L.

36. The method of clause 29 or 30, wherein K is equal to L.

37. The method of clause 30, wherein the first picture is the same as the second picture.

38. The method of clause 30, wherein the first picture is different the second picture.

39. The method of any of previous clauses, wherein the partition tree based on the size of the second block is different from a partition tree based on a fifth block that falls entirely within the picture segment.

40. The method of any of previous clauses, wherein the picture segment is a slice or a tile.

41. An apparatus in a video system comprising a processor and a non-transitory memory with instructions thereon, wherein the instructions upon execution by the processor, cause the processor to implement the method in any one of clauses 1 to 40.

42. A computer program product stored on a non-transitory computer readable media, the computer program product including program code for carrying out the method in any one of clauses 1 to 40.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of coding video data, comprising:
   determining, for a conversion between a picture of a video and a bitstream of the video, that a first block of a picture segment covers at least one region that is outside a border of the picture segment, wherein the picture segment represents one of a plurality of segments into which the picture is segmented, wherein a size of the first block is M×N pixels;
   selecting a second block of size K×L pixels, wherein (K≤M and L<N) or (K<M and L≤N) and the second block falls entirely within the picture segment;
   splitting, using a partition tree, the second block, wherein the second block is split into sub-blocks without an indication of the splitting, wherein a selection of a type of the partition tree used for splitting the second block is based on the size of the second block and further based on a size of a fourth block, wherein the fourth block falls entirely within the picture segment, wherein the size of the fourth block is smaller than the size of the second block, wherein the indication of the splitting is excluded from the bitstream, and wherein a size of at least one of the sub-blocks is identical to the size of the fourth block; and
   performing the conversion based on the determining.

2. The method of claim 1, wherein a size of the partition tree is based on a minimally allowed partition tree size or a maximally allowed partition tree depth.

3. The method of claim 1, wherein the conversion comprises encoding the picture into the bitstream.

4. The method of claim 1, wherein the conversion comprises decoding the picture from the bitstream.

5. The method of claim 1, wherein the second block satisfies at least one of conditions that (i) the second block falls entirely within the picture segment, (ii) the second block has a size that is backward compatible with a video coding standard, or (iii) the second block is a largest coding unit, a leaf coding block or a coding tree block.

6. The method of claim 1, the method further comprises:
   determining that the size of the second block is not backward compatible with a video coding standard.

7. The method of claim 1, further comprising:
   selecting a third block of size K'×L' pixels by padding one or both dimensions of the second block, wherein K≤K' and L≤L', and wherein the size of the third block is backward compatible with a video coding standard, and wherein the third block is a largest coding unit, a leaf coding block or a coding tree block.

8. The method of claim 1, further comprising:
   communicating block sizes that are backward compatible with a video coding standard.

9. The method of claim 1, further comprising:
   communicating indices corresponding to block sizes that are backward compatible with a video coding standard.

10. The method of claim 5, wherein the video coding standard is an H.264/AVC (Advanced Video Coding) standard or an H.265/HEVC (High Efficiency Video Coding) standard or a VVC (Versatile Video Coding) standard.

11. The method of claim 1, wherein the first block is a coding tree unit (CTU), a coding unit (CU), a prediction unit (PU), or a transform unit (TU).

12. The method of claim 11, wherein the CTU comprises a luma coding tree block (CTB) and two corresponding chroma CTBs.

13. The method of claim 12, wherein a partition tree for the luma CTB is identical to the partition tree for at least one of the two corresponding chroma CTBs.

14. The method of claim 12, wherein a partition tree for the luma CTB is different from a partition tree for the corresponding chroma CTB.

15. The method of claim 14, wherein the partition tree for the corresponding chroma CTB comprises partitions that are larger than partitions in the partition tree for the luma CTB.

16. An apparatus for coding video data, comprising a processor and a non-transitory memory with instructions thereon, wherein the instructions upon execution by the processor, cause the processor to:
   determine, for a conversion between a picture of a video and a bitstream of the video, that a first block of a picture segment covers at least one region that is outside a border of the picture segment, wherein the picture segment represents one of a plurality of segments into which the picture is segmented, wherein a size of the first block is M×N pixels;
   select a second block of size K×L pixels, wherein (K≤M and L<N) or (K<M and L≤N) and the second block falls entirely within the picture segment;
   split, using a partition tree, the second block, wherein the second block is split into sub-blocks without an indication of the splitting, wherein a selection of a type of the partition tree used for splitting the second block is based on the size of the second block and further based on a size of a fourth block, wherein the fourth block falls entirely within the picture segment, wherein the size of the fourth block is smaller than the size of the second block, wherein the indication of the splitting is excluded from the conversion, and wherein a size of at least one of the sub-blocks is identical to the size of the fourth block; and
   perform the conversion based on the determining.

17. The apparatus of claim 16, wherein a size of the partition tree is based on a minimally allowed partition tree size or a maximally allowed partition tree depth.

18. A non-transitory computer-readable storage medium storing instructions that cause a processor to:
   determine, for a conversion between a picture of a video and a of the video, that a first block of a picture segment covers at least one region that is outside a border of the picture segment, wherein the picture segment represents one of a plurality of segments into which the picture is segmented, wherein a size of the first block is M×N pixels;
   select a second block of size K×L pixels, wherein (K≤M and L<N) or (K<M and L≤N) and the second block falls entirely within the picture segment;
   split, using a partition tree, the second block, wherein the second block is split into sub-blocks without an indication of the splitting, wherein a selection of a type of the partition tree used for splitting the second block is based on the size of the second block and further based on a size of a fourth block, wherein the fourth block falls entirely within the picture segment, wherein the size of the fourth block is smaller than the size of the second block, wherein the indication of the splitting is excluded from the bitstream, and wherein a size of at least one of the sub-blocks is identical to the size of the fourth block; and perform the conversion based on the determining.

19. A non-transitory computer-readable recording medium storing a bitstream of a video which is generated by a method performed by a video processing apparatus, wherein the method comprises:

determining, for a picture of the video, that a first block of a picture segment covers at least one region that is outside a border of the picture segment, wherein the picture segment represents one of a plurality of segments into which the picture is segmented, wherein a size of the first block is M×N pixels;

selecting a second block of size K×L pixels, wherein (K≤M and L<N) or (K<M and L≤N) and the second block falls entirely within the picture segment;

splitting, using a partition tree, the second block, wherein the second block is split into sub-blocks without an indication of the splitting, wherein a selection of a type of the partition tree used for splitting the second block is based on the size of the second block and further based on a size of a fourth block, wherein the fourth block falls entirely within the picture segment, wherein the size of the fourth block is smaller than the size of the second block, wherein the indication of the splitting is excluded from the bitstream, and wherein a size of at least one of the sub-blocks is identical to the size of the fourth block; and generating the bitstream based on the determining.

20. The non-transitory computer-readable storage medium of claim 18, wherein a size of the partition tree is based on a minimally allowed partition tree size or a maximally allowed partition tree depth.

* * * * *